(12) United States Patent
Nguyen et al.

(10) Patent No.: US 11,853,212 B2
(45) Date of Patent: Dec. 26, 2023

(54) PREEMPTIVE TRACKING OF REMOTE REQUESTS FOR DECENTRALIZED HOT CACHE LINE FAIRNESS TRACKING

(71) Applicant: INTERNATIONAL BUSINESS MACHINES CORPORATION, Armonk, NY (US)

(72) Inventors: Tu-An T. Nguyen, Austin, TX (US); Matthias Klein, Poughkeepsie, NY (US); Gregory William Alexander, Pflugerville, TX (US); Jason D. Kohl, Austin, TX (US); Vesselina Papazova, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 17/713,267

(22) Filed: Apr. 5, 2022

(65) Prior Publication Data

US 2023/0315629 A1    Oct. 5, 2023

(51) Int. Cl.
*G06F 12/0802*     (2016.01)
(52) U.S. Cl.
CPC ...... *G06F 12/0802* (2013.01); *G06F 2212/60* (2013.01)
(58) Field of Classification Search
CPC .................. G06F 12/0802; G06F 2212/60
See application file for complete search history.

(56) References Cited

U.S. PATENT DOCUMENTS

| 6,138,218 | A  | 10/2000 | Arimilli et al. |
|---|---|---|---|
| 7,340,565 | B2 | 3/2008 | Steely, Jr. et al. |
| 8,677,014 | B2 | 3/2014 | Cometto et al. |
| 9,513,959 | B2 | 12/2016 | Biles et al. |
| 10,310,982 | B2 | 6/2019 | Berger et al. |
| 10,339,064 | B2 | 7/2019 | Blake et al. |
| 10,489,294 | B2 | 11/2019 | Blake et al. |
| 10,671,532 | B2 | 6/2020 | Zoellin et al. |
| 10,705,977 | B2 | 7/2020 | Barczak et al. |
| 11,010,210 | B2 | 5/2021 | Sonnelitter et al. |
| 2006/0230233 | A1 | 10/2006 | Steely et al. |
| 2013/0311999 | A1 | 11/2013 | Fetterman et al. |
| 2015/0378919 | A1 | 12/2015 | Anantaraman et al. |
| 2018/0157589 | A1 | 6/2018 | Jayasena et al. |
| 2018/0285277 | A1 | 10/2018 | Blake et al. |
| 2018/0293172 | A1 | 10/2018 | Gott et al. |

(Continued)

OTHER PUBLICATIONS

International Search Report and Written Opinion; dated Jul. 6, 2023; Application No. PCT/EP2023/057385; Filed: Mar. 22, 2023; 14 pages.

(Continued)

*Primary Examiner* — Gurtej Bansal
(74) *Attorney, Agent, or Firm* — CANTOR COLBURN LLP; Nathan Rau

(57) ABSTRACT

Embodiments are for preemptive tracking of remote requests for decentralized hot cache line fairness tracking. Authority is requested for a cache line in conjunction with querying for outstanding requests for the cache line. One or more responses are received regarding the outstanding requests for the cache line. In response to receiving the one or more responses regarding the outstanding requests and in advance of receiving the authority for the cache line, the outstanding requests are preemptively tracked in a requested structure associated with the cache line.

20 Claims, 16 Drawing Sheets

(56) References Cited

U.S. PATENT DOCUMENTS

2018/0314447 A1    11/2018    Driever et al.

OTHER PUBLICATIONS

Alexander, "Hot Line Fairness Mechanism Favoring Software Forward Progress", U.S. Appl. No. 17/713,263, filed Apr. 5, 2022.
Anonymous—"Method and Apparatus for Dynamic Cache Bypass and Insertion"; IPCOM000223644D; ip.com Nov. 20, 2012; 7p.
Anonymous, "Distributed Software Controlled Cache"; IPCOM000188596D, ip.com; Oct. 15, 2009, 4p.
Anonymous, "Fairness circuit for automic read-modify-write operations on multiprocessor systems", ip.com, IPCOM000256121D; Nov. 6, 2018, 5p.
Anonymous, "Improving CPU Cache Performance"; ip.com, IPCOM000192659D; Jan. 27, 2010, 3p.
Anonymous, "Method and Apparatus for Cooperative State Prefetching in Clustered Shared Memory Multiprocessor Systems with Region Coherence Arrays"; ip.com IPCOM000180817D; Mar. 17, 2009; 7 pages.
Anonymous, "Method and Apparatus for Coordinating a Single Active and Multiple Hot-Standby Systems in an Automated FailOver Configuration", IPCOM000245147D, IP.com; Feb. 14, 2016; 7p.
Anonymous, "Method for Prefetching Cache Lines Based on the Presence of Uninitialized Lines", IPCOM000027339D, IP.com; Apr. 7, 2004, 3p.
Anonymous; "Method for Decentralized Lock Management of Shared Resources Across Distributed Priority Nodes"; IPCOM000264621D; Jan. 12, 2021; 5p.
Anonymous; "Method to Handle Speculative Load Requests in a Cache Environment"; IPCOM000188235D; ip.com; Sep. 28, 2009; 2p.
Anonymously, "Machine-Learned Caching of Datasets"; IPCOM000252027D; ip.com; Dec. 14, 2017; 38 pgs.
Dessouki, "JACS—Just Another Communications Stack", IPCOM000262014D; ip.com, Apr. 24, 2020, 35 p.
Lipasti, "Cache Replacement Policies"; ECE/CS 752 Spring 2016, 25 p.
List of IBM Patents or Patent Applications Treated as Related; Date Filed: Apr. 5, 2022, 2 pages.
Nguyen, "Decentralized Hot Cache Line Tracking Fairness Mechanism", U.S. Appl. No. 17/713,264, filed Apr. 5, 2022.
Novakovic, "Storm: a fast transactional dataplane for remote data structures"; ResearchGate; Feb. 2019; 16p.
Rudolph; "Dynamic Decentralized Cache Schemes for MIMD Parallel Processors"; ACM SIGARCH Computer Architecture News; Jun. 1984; 28 p.
Zakhary, "Cache on Track (CoT): Decentralized Elastic Caches for Cloud Environments"; Series ISSN: 2367-2005; Proceedings of the 24th International Conference on Extending Database Technology; Mar. 20, 2021; 12p.
International Search Report and Written Opinion for International Application No. PCT/EP2023/058121; International Filing Date: Mar. 29, 2023; dated Jun. 22, 2023; 11 pages.

FIG. 4

HOT LINE FAIRNESS VECTORS

| REQUESTED VECTOR | | |
|---|---|---|
| CHIP | DRAWER | SYSTEM |
| 0000 | 000 | 000 |

| SERVICED VECTOR | | |
|---|---|---|
| CHIP | DRAWER | SYSTEM |
| 0000 | 000 | 000 |

(REQUESTED VECTOR, SERVICED VECTOR)
CHIP SCOPE (LOWEST SCOPE)

0000 → L30, L31, L32, L33

(REQUESTED VECTOR, SERVICED VECTOR)
DRAWER SCOPE (NEXT HIGHEST SCOPE)

000 → CHIP0, CHIP1, CHIP2

(REQUESTED VECTOR, SERVICED VECTOR)
SYSTEM SCOPE (HIGHEST SCOPE)

000 → DRAWER0, DRAWER1, DRAWER2

FIG. 6

601 - L30 HAS THE CACHE LINE.

| L30 LFAR STATE | REQUESTED VECTOR | | SERVICED VECTOR | |
|---|---|---|---|---|
| | CHIP | DRAWER | CHIP | DRAWER |
| WORKING ON CACHE LINE | 0000 | 00 | 1000 | 10 |

602 - L32 REQUESTS THE CACHE LINE. L32 SNOOPS L33 AND GETS A RESPONSE THAT IT HAS AN OUTSTANDING FETCH TO THE LINE.
- L32 SPECULATIVELY SETS THE REQUESTED BIT FOR L33 IN ITS REQUESTED VECTOR.

| L32 LFAR STATE | REQUESTED VECTOR | | SERVICED VECTOR | |
|---|---|---|---|---|
| | CHIP | DRAWER | CHIP | DRAWER |
| REQUESTING CACHE LINE | 000<u>1</u> | 00 | 0000 | 00 |

FIG. 7

(FROM FIG. 6)

603 - L32 SNOOPS L30 AND IS GIVEN A COPY OF THE LINE AND L30'S SERVICED VECTOR.
- L32 THEN SETS ITS OWN SERVICED BITS. L32 CAN KEEP THE REQUESTED BIT THAT IT SET ON THIS BROADCAST.

| L32 LFAR STATE | REQUESTED VECTOR | | SERVICED VECTOR | |
|---|---|---|---|---|
| | CHIP | DRAWER | CHIP | DRAWER |
| WORKING ON CACHE LINE | 0001 | 00 | 101<u>0</u> | 10 |

604 - L33 REQUESTS THE CACHE LINE WHILE L32'S REQUEST IS STILL OUTSTANDING.
- L33 SNOOPS L32 AND GETS A RESPONSE THAT IT HAS AN OUTSTANDING FETCH TO THE LINE.

| L33 LFAR STATE | REQUESTED VECTOR | | SERVICED VECTOR | |
|---|---|---|---|---|
| | CHIP | DRAWER | CHIP | DRAWER |
| REQUESTING CACHE LINE | 001<u>0</u> | 00 | 1000 | 10 |

FIG. 8

(FROM FIG. 7) 

605 – L33 SNOOPS L30 AND IS REJECTED BECAUSE THE LINE IS BEING MOVED TO L32.
- L33 MUST RESET THE REQUESTED BIT FOR L32 THAT IT SET SPECULATIVELY ON THIS BROADCAST.

| L33 LFAR STATE | REQUESTED VECTOR | | SERVICED VECTOR | |
|---|---|---|---|---|
| | CHIP | DRAWER | CHIP | DRAWER |
| FAILED TO GET CACHE LINE | 0000 | 00 | 0000 | 00 |

606 – L33 RE-REQUESTS THE CACHE LINE. L32 PASSES THE CACHE LINE TO L33.

| L32 LFAR STATE | REQUESTED VECTOR | | SERVICED VECTOR | |
|---|---|---|---|---|
| | CHIP | DRAWER | CHIP | DRAWER |
| WORKING ON CACHE LINE | 0000 | 00 | 1011 | 10 |

FIG. 15
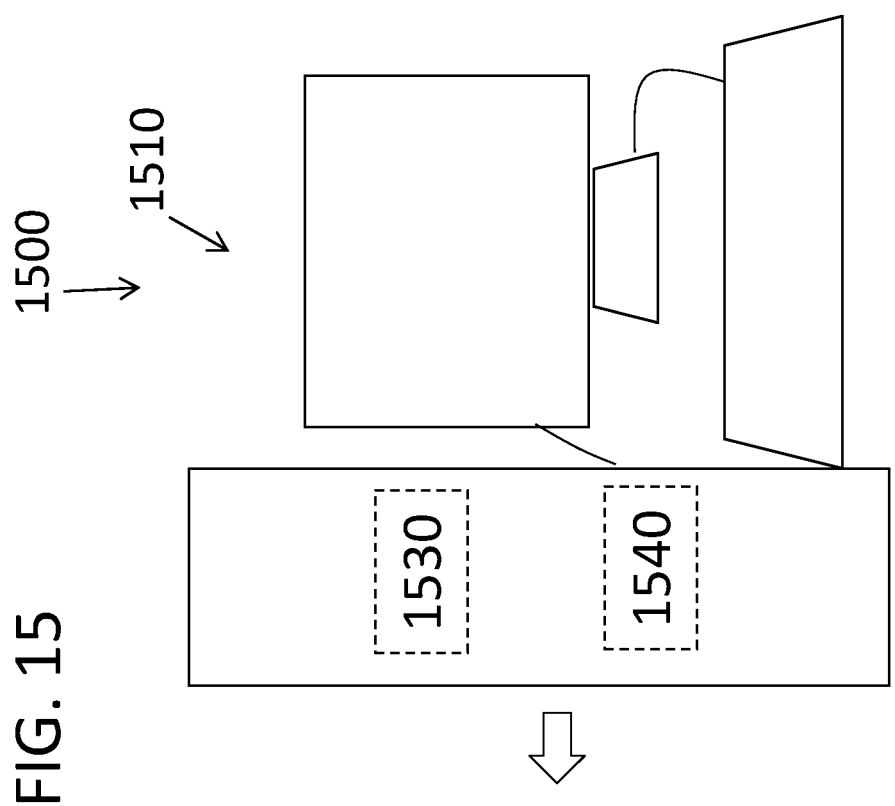
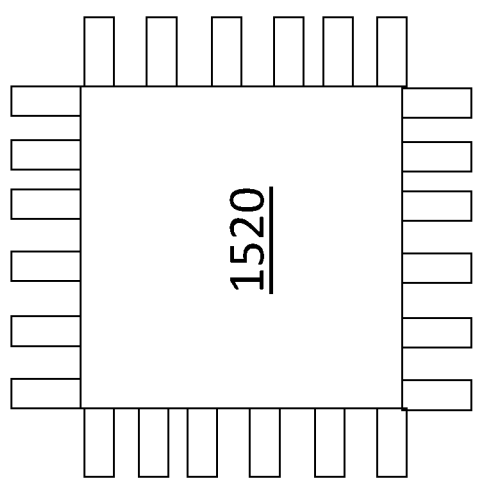

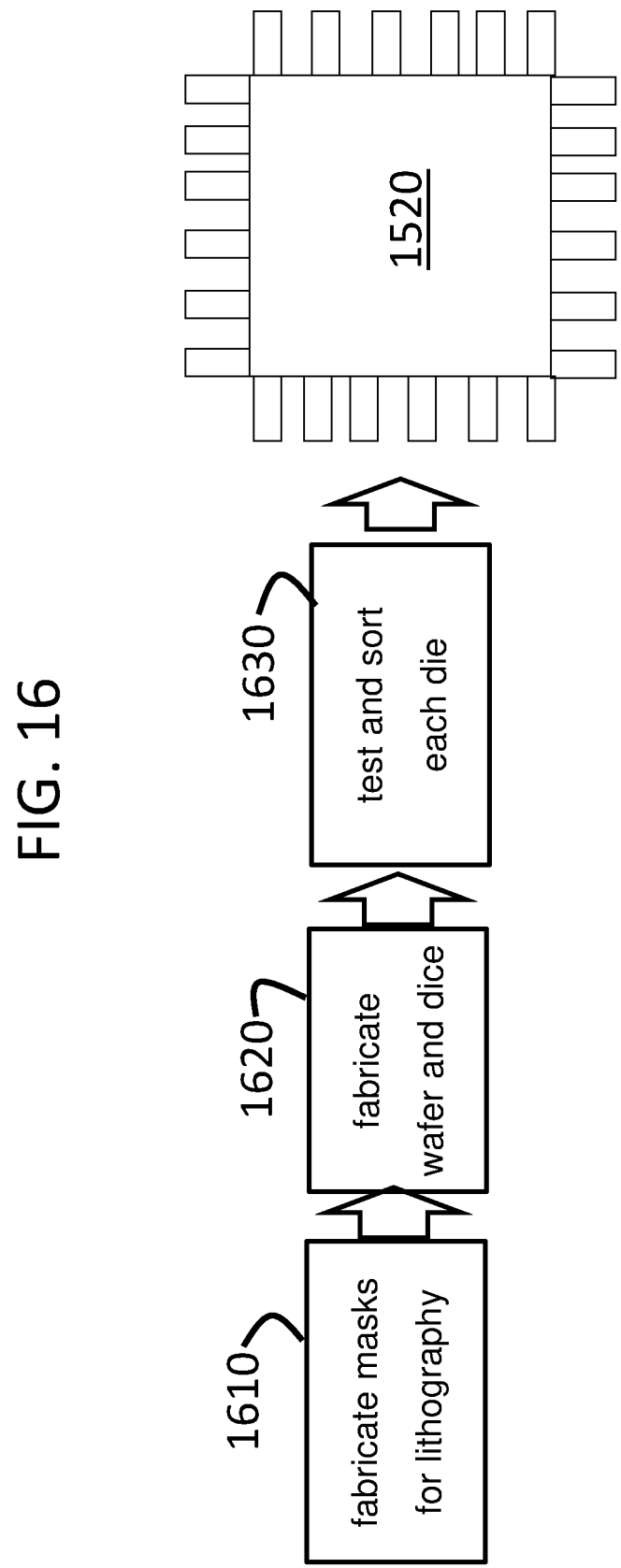

PREEMPTIVE TRACKING OF REMOTE REQUESTS FOR DECENTRALIZED HOT CACHE LINE FAIRNESS TRACKING

BACKGROUND

The present invention generally relates to computer systems, and more specifically, to computer-implemented methods, computer systems, and computer program products configured and arranged for providing preemptive tracking of remote requests for decentralized hot cache line fairness tracking.

In computing environments that have multiple processor chips on the same drawers and/or processor chips in other drawers sharing one or more caches, those processor chips may have access to the same cache lines. A cache line or line is a portion of data of a specific size (e.g., 256 bytes), which fits into a single cache entry in a cache. Coherency is managed on a cache line granularity as data is transferred between memory and a cache. To ensure coherency of a cache line, snoop requests (also referred as snoops or fetch requests) are used. Snoop requests are processed by receiving a snoop request from a requesting cache, determining if this cache has a copy of the cache line in an appropriate state, sending the cache line to the requesting cache, and updating the state of the cache line in this cache.

A cache structure and its related services provide processor chips with data consistency of their shared data. Many processor chips on the same drawer and/or processor chips on different drawers may attempt to access the same cache line. Techniques are needed to improve access to a cache line of a shared cache.

SUMMARY

Embodiments of the present invention are directed to computer-implemented methods for providing preemptive tracking of remote requests for decentralized hot cache line fairness tracking. A non-limiting computer-implemented method includes requesting authority for a cache line in conjunction with querying for outstanding requests for the cache line and receiving one or more responses regarding the outstanding requests for the cache line. Also, the method includes, in response to receiving the one or more responses regarding the outstanding requests and in advance of receiving the authority for the cache line, preemptively tracking the outstanding requests in a requested structure associated with the cache line.

This can provide an improvement over known methods for processing cache requests by efficiently providing a fairness tracking mechanism to ensure that all requestors who need access to the cache line will gain access to the line in a timely and fair manner. One or more embodiments of the invention overcome the scalability issues of prior implementations by using a decentralized, hierarchical hot cache line fairness mechanism. One or more embodiments of the invention preemptively build the requested structure in advance of obtaining access of the cache line, to thereby provide an efficient technique of maintaining a complete picture of who is requesting access to the hot cache line, resulting in fairness to all requestors.

In addition to one or more of the features described above or below, or as an alternative, in further embodiments of the invention the method includes, in response to receiving the authority for the cache line along with receiving access to the cache line, receiving transfer of a serviced structure associated with the cache line and keeping bits set in the requested structure, wherein the bits were set in advance of receiving the authority. One or more embodiments advantageously use vectors that are allocated, deallocated, and associated with each cache line, and one or more of these vectors are passed around the system with the data of each cache line, eliminating the need for a large centralized physical space in the design. In addition, these vectors are structured hierarchically, reducing the storage space required.

In addition to one or more of the features described above or below, or as an alternative, in further embodiments of the invention the method includes, in response to not receiving the authority for the cache line, resetting the requested structure. One or more embodiments advantageously use vectors that are allocated, deallocated, and associated with each cache line, and one or more of these vectors are passed around the system with the data of each cache line, eliminating the need for a large centralized physical space in the design. In addition, these vectors are structured hierarchically, reducing the storage space required.

In addition to one or more of the features described above or below, or as an alternative, in further embodiments of the invention a serviced structure is received from a controller previously having the authority, the serviced structure being configured to track requests to access the cache line that were observed and have been granted access to the cache line. One or more embodiments advantageously provide vectors working concurrently to form encoded states of where the hot cache line has been requested and where it has already been granted access, thereby eliminating the need for a large centralized physical space in the design. A requestor who re-requests the same cache line (has already been granted access to the hot cache line once before) cannot receive the line again if there are other requestors who previously requested the cache line and have not been granted access yet.

In addition to one or more of the features described above or below, or as an alternative, in further embodiments of the invention the requested structure is built in anticipation of receiving the authority for a cache line. One or more embodiments of the invention preemptively build the requested structure in advance of obtaining access of the cache line, to thereby provide an efficient technique of maintaining a complete picture of who is requesting access to the hot cache line, resulting in fairness to all requestors. One or more embodiments of the invention overcome the scalability issues of prior implementations by using a decentralized, hierarchical hot cache line fairness mechanism.

In addition to one or more of the features described above or below, or as an alternative, in further embodiments of the invention the one or more responses regarding the outstanding requests correspond to an exclusive fetch request, or a fetch, if the authority of the snooped cache line is one authority level less than the authority of the requestor (i.e., the scope of the broadcast). One or more embodiments of the invention preemptively build the requested structure in advance of obtaining access of the cache line, to thereby provide an efficient technique of maintaining a complete picture of who is requesting access to the hot cache line, resulting in fairness to all requestors. One or more embodiments of the invention overcome the scalability issues of prior implementations by using a decentralized, hierarchical hot cache line fairness mechanism.

Other embodiments of the present invention implement features of the above-described methods in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts a block diagram illustrating an example requested vector and an example serviced vector for each cache line in decentralized hierarchical hot line fairness tracking according to one or more embodiments of the present invention;

FIGS. 6, 7, and 8 depict block diagrams illustrating an example of vector maintenance and passing for decentralized hot cache line tracking fairness using preemptive tracking of remote requests according to one or more embodiments of the present invention;

FIG. 15 is a block diagram of a system to design/layout of an integrated circuit (IC) using a decentralized hot cache line tracking fairness mechanism in an IC in accordance with one or more embodiments of the present invention; and FIG. 16 is a process flow of a method of fabricating the IC of FIG. 15 in accordance with one or more embodiments of the present invention.

DETAILED DESCRIPTION

Figure 1:
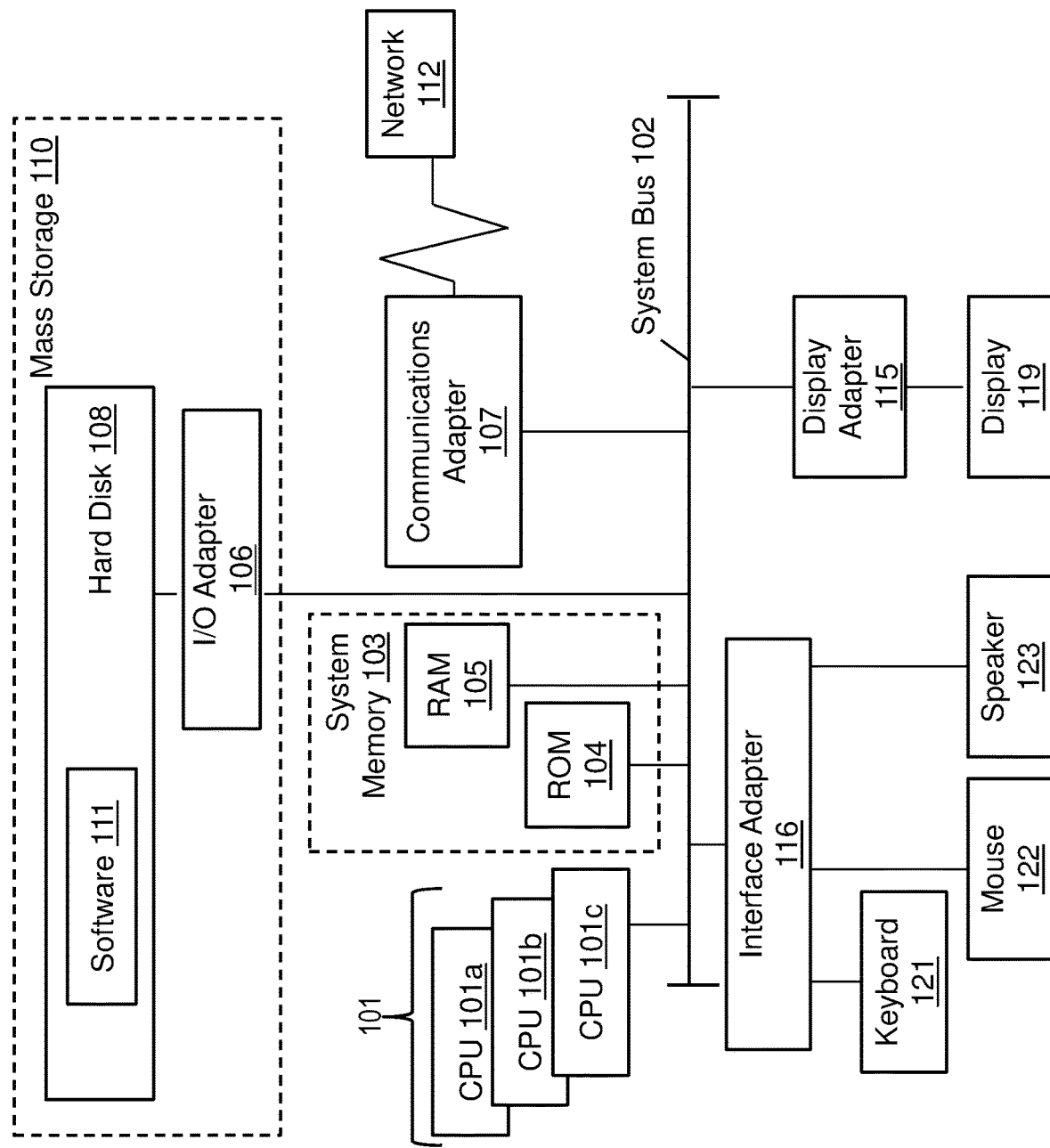
FIG. 1 depicts a block diagram of an example computer system for use in conjunction with one or more embodiments of the present invention.

One or more embodiments of the invention are configured to provide a decentralized hot cache line tracking fairness mechanism. One or more embodiments of the invention provide a technique for decentralized tracking of hot line (cache line) requests, using two vectors that are allocated, deallocated, and associated with each cache line. One vector is a requested vector, and the other vector is a serviced vector. The requested vector is a vector that tracks requests to access the cache line in which the requests were observed, but access has not been granted. The serviced vector is a vector that tracks requests to access the cache line in which the requests were observed and have been granted access to the cache line. Per cache line, the requested vectors and the serviced vectors are passed around the system with the data of each cache line, eliminating the need for a large centralized physical space in the design. In addition, the requested and serviced vectors are structured hierarchically, reducing the storage space required. The two vectors, requested vector and serviced vector, work concurrently to form encoded states indicating where the hot cache line has been requested and where (e.g., to whom) the hot cache line has already been granted access. A requestor who re-requests the same cache line (i.e., has already been granted access to the hot cache line once before) cannot receive the cache line again if there are other requestors who have previously requested the cache line and have not been granted access yet.

Further, one or more embodiments of the invention provide preemptive tracking of remote requests for decentralized hot cache line fairness tracking. A reverse compare decentralized hot cache line fairness tracking mechanism is disclosed which provides a technique that efficiently and preemptively gathers a more complete picture of which other requestors are requesting a hot cache line. Rather than waiting for snoops (which are requests) to arrive at the requestor after the requestor has gotten authority, the requestor is configured to preemptively query the remote caches (i.e., other requestors) at the same time as the requestor transmits its broadcast to gain authority, and requestor is configured to speculatively collect information on remote requestors that are fetching the cache line. If the authority is not achieved by the requestor, the requestor is configured to drop the speculative information gained from preemptively querying the other requestors (i.e., remote caches). This technique provides a more complete picture of which remote requestors are looking for the cache line, in order to provide efficiency and fairness to all requestors.

A hot line or hot cache line is a cache line that numerous operations, as requestors, are trying to access to observe and/or to modify. Cache lines can only be accessed by one operation a time. When there are multiple requests to access the cache line, there is a backlog of operations that are waiting to access the cache line as another operation is working on the cache line. Unsuccessful requestors, those who have requested the cache line and did not get access to the cache line, are rejected back to origin and must start the requesting process over again. Meanwhile, requestors who already accessed the cache line could request for the line again and their requests could arrive before the unsuccessful requestors come back asking for (i.e., requesting) the cache line. This could cause unsuccessful requestors to get starved or blocked out because other requestors continue getting access to the cache line repeatedly, and the unsuccessful requestors wait too long to get the cache line. This type of behavior negatively impacts performance and response times because the operation that requested the cache line is then stalled for long periods of time and forward progress is not made.

Accordingly, one or more embodiments of the invention provide a fairness tracking mechanism to ensure that all requestors who need access to the cache line will gain access to the cache line in a timely and fair manner. As technical solutions and benefits, one or more embodiments use the requested vectors and serviced vectors to improve performance and response times of cache requests from requestors by ensuring that forward progress is being made.

For the sake of brevity, conventional techniques related to semiconductor device and IC fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
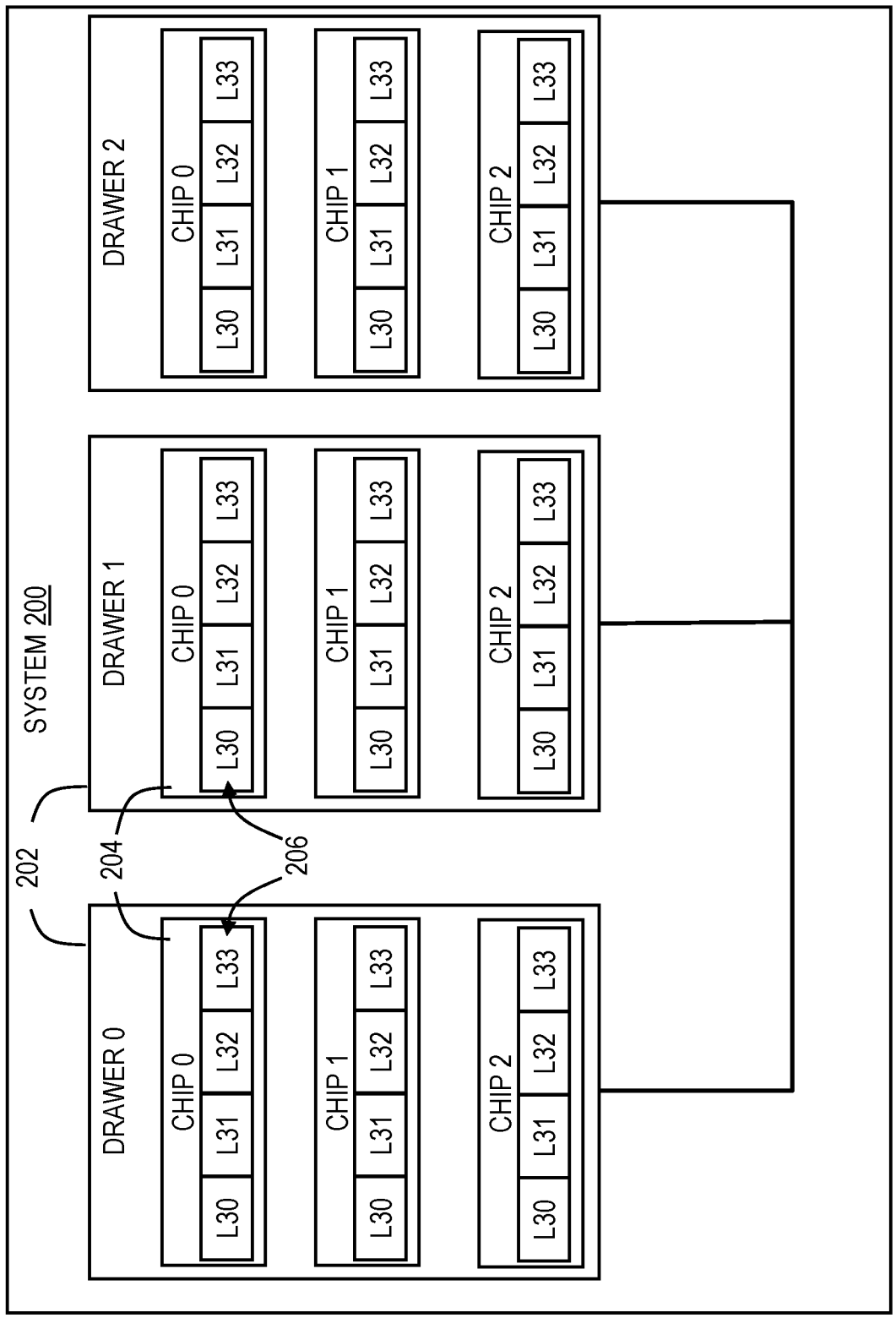
FIG. 2 depicts a block diagram of an example system configured to provide a decentralized hot cache line tracking fairness mechanism according to one or more embodiments of the present invention.
Figure 3:
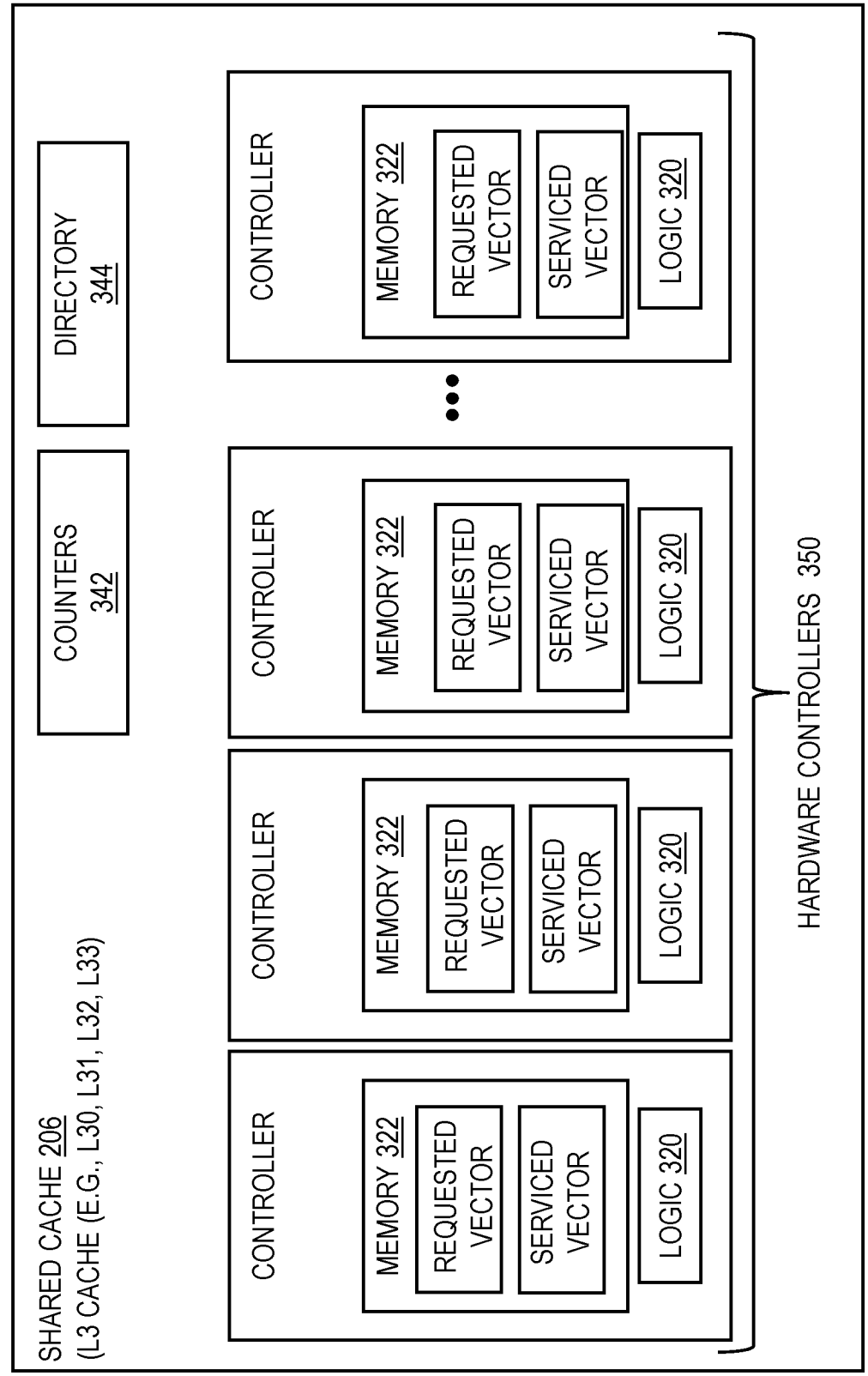
FIG. 3 depicts a block diagram of an example shared cache configured to provide a decentralized hot cache line tracking fairness mechanism according to one or more embodiments of the present invention.

FIG. 2 depicts a block diagram of an example system 200 configured to provide a decentralized hot cache line tracking fairness mechanism according to one or more embodiments of the invention. In system 200, there can be many interconnected drawers 202, such as drawer 0, drawer 1, and drawer 2. Each of the drawers 202 includes processor chips 204, such as processor chip 0, processor chip 1, and processor chip 2. Each processor chip 204 is coupled to and/or includes shared caches 206 (e.g., level three (L3) caches), such as L30, L31, L32, and L33. Further details of an example shared cache 206 is depicted in FIG. 3. Computer system 100 may be integrated with and/or use processor chips 204 in FIG. 2. Many computer systems 100 and/or features of computer systems 100 may be integrated in system 200. The system 200 may be representative of one or more portions of a cloud computing environment 50 depicted in FIG. 11. One or more processors 101 may represent processor chips 204. The processor chips 204 include all the standard processing circuitry and shared caches 206 include the standard memory and circuity as understood by one of ordinary skill in the art. Although not shown for conciseness, the processor chips can include higher-level caches, such as L2 caches and L1 caches, where the L1 cache is closest to the processor core as understood by one of ordinary skill in the art.

FIG. 3 depicts a block diagram of an example shared cache 206 (e.g., L30, L31, L32, L33) configured to provide a decentralized hot cache line tracking fairness mechanism according to one or more embodiments of the invention. Although details of a single shared cache 206 are illustrated in FIG. 3, the discussion applies by analogy to the other shared caches 206. Shared cache 206 can include and/or be coupled to various hardware controllers 350 in which the hardware controllers 350 are configured to control access to cache lines on the shared cache 206 such as for reading or writing, to send requests to access other cache lines on other shared caches 206, and to implement a requested vector and serviced vector per cache line according to one or more embodiments. Particularly, each hardware controller 350 includes logic 320 configured to provide decentralized hot cache line tracking fairness using a requested vector and serviced vector. A hardware controller 350 may include the requested vector and serviced vector for a single cache line in memory 322, and the requested vector and serviced vector for the cache line are passed along as metadata to the next hardware controller 350 along with the data in the cache line. As such, each cache line in a shared cache 206 has its own requested vector and serviced vector which are maintained and passed throughout the system 200 according to one or more embodiments.

Hardware controllers 350 can include the functionality of one or more known hardware controllers. Hardware controllers 350 can be and/or include functionality of local fetch address register controllers (LFARs), control store address register controllers (CSARs), central processor fetch controllers (CFARs), remote fetch controllers (RFARs), line local store address register controllers (L-LSARs), remote local store address register controllers (R-LSARs), remote store address controller (RSAR), and other hardware controllers understood by one of ordinary skill in the art. Logic 320 can include logic circuitry, firmware executable by circuits on hardware controller 350, and/or a combination of logic circuitry and firmware. Moreover, logic 320 can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, logic 320 described herein can be a combination of hardware and programming. The programming can be processor executable instructions stored on a tangible memory, and the hardware can include processing circuitry for executing those instructions. Alternatively or additionally, logic 320 can include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. Logic 320 of hardware controllers 350 of the shared caches are configured to provide a decentralized hierarchical hot line fairness tracking mechanism. This mechanism is comparable to centralized fairness tracking in terms of performance, and it scales. The decentralized mechanism grows organically and does not need additional space for each address. As noted herein, the decentralized hierarchical fairness tracking mechanism uses a requested vector and a serviced vector, which are allocated, deallocated, and associated with a single cache line.

FIG. 4 depicts a block diagram illustrating an example requested vector and an example serviced vector used for each cache line in decentralized hierarchical hot line fairness tracking according to one or more embodiments. The requested vector and/or serviced vector are passed around the system 200 along with and at the same time as passing the data in a cache line, thereby eliminating the need for a large centralized physical space in the design. The requested vector and the serviced vector are built by the hardware controllers 350. In one or more embodiments, a hardware controller 350 may pass the serviced vector but not pass the requested vector to the next hardware controller 350 that is receiving the cache line, because the next hardware controller 350 preemptively built the requested vector in advance of receiving access/authority to the cache line. Each cache line has its own requested vector and serviced vector. In addition, the requested and serviced vectors are structured hierarchically, reducing the storage space required as compared to a centralized queue. The serviced vector is a vector that tracks requests to access the cache line that were observed and have been granted access to the cache line. The requested vector is a vector that tracks requests to access the cache line that were observed, but access has not been granted. The requested and serviced vectors work concurrently to form encoded states of where the hot cache line has been requested and where it has already been granted access. A requestor who re-requests the same cache line (has already been granted access to the hot cache line once before) cannot receive the line again if there are other requestors who want the cache line and have not been granted access yet.

As further details of the structure of the serviced and requested vectors illustrated in FIG. 4, each vector includes scopes, which can be defined to function as desired. In one or more embodiments, FIG. 4 illustrates an example in which the serviced and requested vectors each include three hierarchical scopes which are the chip scope, drawer scope, and system scope. In the hierarchy, the drawer scope is higher than the chip scope, and the system scope is higher than the drawer scope. Each vector is kept within the hardware controllers 350 instead of the directory 344, thereby minimizing the number of bits needed, because there are a smaller number of hardware controllers 350 compared to number of cache entries in the directory 344. Although the requested and serviced vectors are described as vectors, it should be appreciated that any structure could be utilized to maintain, store, and eventually pass/transfer the respective states having a respective state per requestor.

Figure 5A:
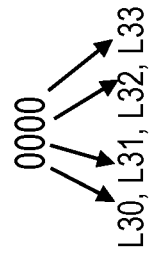
FIG. 5A illustrates an example chip scope for a hardware controller according to one or more embodiments of the present invention.

In FIG. 4, the chip scope which is the lowest scope tracks requests from other shared caches 206 (e.g., other L3 caches) on the same chip as the current shared cache 206 that has access to the cache line. Each shared cache 206 (e.g., L3 cache) on a chip 204 gets a unique bit corresponding to the particular shared cache 206 in the service and requested vectors. FIG. 5A illustrates an example chip scope for an example hardware controller 350 according to one or more embodiments. In FIG. 5A, the chip scope of the vector could be representative of a requested vector and/or a serviced vector. Because each processor chip (e.g., chip 0, chip 1, chip 2) has four shared caches (L30, L31, L32, L33), there are four bit places, one unique bit place (position) assigned to each shared cache 206 in the processor chip (such as, e.g., chip 0), as depicted in FIG. 5A. It is noted that the designation of bit places is from left to right in this example, but the designation could be from right to left, or some other designation. From left to right, the bit place/position in the chip scope corresponds to L30, L31, L32, L33 in an individual chip 204. Four bits are illustrated to represent the four example shared caches 206 in FIG. 2, but more or fewer chip scope bits can be utilized according to the number of shared caches 206 in an induvial chip 204.

Figure 5B:
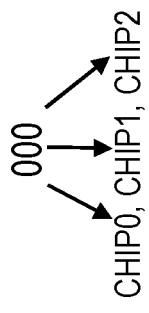
FIG. 5B illustrates an example drawer scope for a hardware controller according to one or more embodiments of the present invention.

In FIG. 4, the drawer scope tracks requests from other chips 204 that are on the same drawer 202 as the controlling hardware controller 350 of current shared cache 206 that has access to the cache line. Each chip 204 on a drawer 202 gets a unique bit corresponding to the particular chip 204 in the service and requested vectors. FIG. 5B illustrates an example drawer scope for an example hardware controller 350 according to one or more embodiments. In FIG. 5B, the drawer scope of the vector could be representative of a requested vector and/or a serviced vector. Because each drawer 202 (e.g., drawer 0, drawer 1, drawer 2) has three processor chips 204 (e.g., chip 0, chip 1, chip 2), there are three bit places, one unique bit place (position) assigned to each processor chip (e.g., chip 0, chip 1, chip 2) in a drawer 202 (such as, e.g., drawer 0), as depicted in FIG. 5B. From left to right, the bit place/position in the drawer scope corresponds to chip 0, chip 1, chip 2 in an individual drawer 202. Three bits are illustrated to represent the three example chips 204 in FIG. 2, but more or fewer drawer scope bits can be utilized according to the number of chips 204 in an individual drawer 202.

Figure 5C:
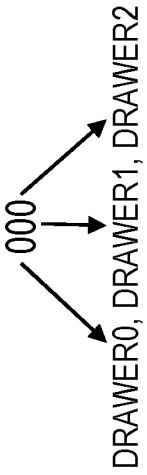
FIG. 5C illustrates an example system scope for a hardware controller according to one or more embodiments of the present invention.

In FIG. 4, the system scope tracks requests from other drawers 202. Each drawer 202 on the system 200 gets a unique bit corresponding to a particular drawer 202 in the service and requested vectors. FIG. 5C illustrates an example system scope for an example hardware controller 350 according to one or more embodiments. In FIG. 5C, the system scope of the vector could be representative of a requested vector and/or a serviced vector. Because the system 200 has three drawers 202 (e.g., drawer 0, drawer 1, drawer 2), there are three bit places, one unique bit place (position) assigned to each drawer 202 (e.g., drawer 0, drawer 1, drawer 2) in the system 200, as depicted in FIG. 5C. From left to right, the bit place/position in the system scope corresponds to drawer 0, drawer 1, drawer 2 in the system 200. Three bits are illustrated to represent the three example drawers 202 in FIG. 2, but more or fewer system scope bits can be utilized according to the number of drawers 202 in the system 200.

The hardware controllers 350 use an authority level for a cache line to set and reset tracking bits in the requested and serviced vectors for that cache line. Each cache line has its own associated requested vectors and serviced vectors. There are three types of authority levels discussed below, which include Global/System Coherency Authority, Drawer Coherency Authority, and Chip Coherency Authority. Global/System Coherency Authority (Global Intervention Master, or GIM) for a cache line is the highest point of coherency for that cache line if a GIM copy of the cache line exists in a shared cache 206. This authority is acquired by a hardware controller 350 by receiving a cache line and GIM authority for the cache line from the previous GIM (authority) for that cache line, and/or by determining that there are no other copies in the system 200 with GIM for the requested cache line in which case only the GIM then has authority to receive the cache line from memory. If an exclusive copy of the cache line exists in a shared cache, that cache line must also be the GIM. The GIM for a cache line is also the Drawer Intervention Master or DIM for its drawer and the Chip Intervention Master or CIM for its chip. In the 3-level intervention master hierarchy, only the GIM is allowed to return data for requests from other drawers, according to one or more embodiments. For a given cache line, there can only be one GIM in a system 200.

Next, turning to the Drawer Coherency Authority (Drawer Intervention Master, or DIM) for a cache line, the DIM is the highest level of authority for that cache line in a drawer 202. This authority is acquired by a hardware controller 350 by receiving DIM authority for the cache line from the previous DIM on the drawer 202 for that cache line, and/or by determining that there are no other copies in the drawer 202 with DIM for the requested cache line in which case only the DIM then has authority to request the cache line from other drawers 202. A GIM copy of the cache line may be downgraded to DIM when a shared copy of the cache line and GIM authority are passed to another drawer 202. If a shared cache 206 controlled by a hardware controller 350 has a copy of the cache line with DIM authority but not GIM authority, the hardware controller 350 must have a read-only copy of the line. The DIM for a cache line is also the CIM for its chip 204. In the 3-level intervention master hierarchy, only the DIM is allowed to return data for requests from other chips on its drawer, according to one or more embodiments. For a given cache line, there can be as many DIMs in the system 200 as there are drawers 202, but only one DIM per drawer.

Chip Coherency Authority (Chip Intervention Master, or CIM) for a cache line is the highest level of authority for that cache line in a chip. This authority is acquired by a hardware controller 350 by receiving CIM authority for the cache line from the previous CIM on the chip for that cache line, and/or by determining that there are no other copies on the chip with CIM for the requested cache line in which case only the CIM then has authority to request the cache line from other chips. A DIM copy of the line may be downgraded to CIM when a shared copy of the cache line and DIM authority are passed to another chip 204. If a cache has a copy of the cache line with CIM authority but not GIM authority, the controlling hardware controller 350 must have a read-only copy of the line. In the 3-level intervention master hierarchy, only the CIM is allowed to return data for requests from other shared caches 206 on its chip.

A non-intervention master copy of a cache line is a read-only copy of the cache line in a shared cache 206 (e.g., L3 cache) that does not have any authority to share the cache line with other requesters. This can sometimes be thought of as the lowest coherency scope.

Turning to further details regarding maintaining the requested and serviced vectors, an example is discussed for setting and resetting tracking bits in the requested and serviced vectors for a cache line. As noted herein, hardware controllers 350 are responsible for setting and maintaining the fairness vectors. Each hardware controller 350 updates both vectors (i.e., requested vector and serviced vector) based on the on-chip and off-chip requests that the particular hardware controller 350 observes, as well as based on the fairness the hardware controller 350 receives once it gets access to the cache line. For example, once a hardware controller 350 receives data that indicates there are unserviced requestors, the hardware controller 350 does not retire as usual after the hardware controller 350 returns data to the processor core. Instead, the hardware controller 350 remains active to protect the cache line until an eligible requestor arrives. While waiting for an eligible requestor to arrive, the hardware controller 350 ensures that requests (also referred to as snoops) from non-eligible requestors get a coherency reject.

To set a requested bit in a scope, a snoop broadcast from a requestor must compare against a remote hardware controller 350 of a remote shared cache that has the authority level one level lower than the authority level that can service both the requestor and the remote shared cache 206 (e.g., L3 cache) on a broadcast where the requestor ends with the authority level that can service both the requestor and the remote shared cache. The remote hardware controller works for its shared cache and is the controlling hardware controller for a cache line of a given shared cache. The requestor requesting access to the cache line of the given shared cache is the requestor hardware controller of its shared cache. Because each shared cache has its own hardware controllers, sometimes a shared cache may be referred to as requesting a cache line. To set a bit in the requested vector for the chip scope, the requesting hardware controller 350 of the requesting shared cache 206 (e.g., shared cache L30) must establish itself as at least a chip coherency authority during or before the broadcast where hardware controller 350 can start tracking requests from other hardware controllers 350 corresponding to other shared caches 206 (e.g., other shared caches L31, L32, L33) on the processor chip 204 (such as, e.g., processor chip 0).

To set a bit in the requested vector for drawer scope, the requesting hardware controller 350 of the requesting shared cache 206 must establish itself as at least a drawer coherency authority during or before the broadcast where hardware controller 350 can start tracking requests from other chips 204 on the drawer 202 for the cache line of a given shared cache. Requestors on remote chips must be for an Exclusive Fetch or have reached at least chip coherency authority for the requesting controller to set a bit in the requested vector.

To set a bit in the requested vector for system scope, the requesting hardware controller 350 of the requesting shared cache 206 must establish itself as the system coherency authority during or before the broadcast where the hardware controller 350 can start tracking requests from other drawers 202 on the system 200 for the cache line of a given shared cache. Requestors on remote drawers must be for an Exclusive Fetch or have reached at least drawer coherency authority for the requesting controller to set a bit in the requested vector.

These setting restrictions are utilized because otherwise, an observed request could be served by someone else (e.g., another hardware controller 350 for another shared cached 206 that does have proper authority) and should not be counted as a request that must be serviced by the local hardware controller 350 for a shared cache 206.

Further details of maintaining the requested and serviced vectors are discussed below. For a serviced vector, serviced bits in a scope (e.g., such as chip, drawer, and system scopes) get set when a local hardware controller 350 for its corresponding shared cache 206 with access to the cache line data sets its own corresponding chip, drawer, and system bits. For a requested vector, requested bits in a scope (e.g., such as chip, drawer, and system scopes) get reset when the corresponding serviced bit of the serviced vector is set in the same scope, as well as when the local shared cache 206 via its hardware controller 350 invalidates its own copy, and/or a timeout limit has been reached. For a serviced vector, serviced bits in a scope (e.g., such as chip, drawer, and system scopes) get reset when all known requestors have been serviced, when the local shared cache 206 via its hardware controller 350 invalidates its copy, and/or when the timeout limit has been reached. Requested and serviced bits in a lower scope are reset when the cache line is passed to a requestor of a higher scope (i.e., drawer vector gets cleared if the cache line is passed to another drawer, but the drawer vector will keep its data if the cache line is passed to another chip on the same drawer). Moreover, the drawer scope/vector refers to the chips on this drawer, which is relative to the L3 cache maintaining the vector. If the cache line moves to another chip on this same drawer, the drawer vector values are still meaningful for the receiving chip since the drawer vectors of both the sending and receiving chip refer to chips on the same drawer. On the other hand, if the cache line moves to a chip on another drawer, then the new drawer scope/vector created on the receiving chip will refer to the receiving drawer, while the drawer scope/vector on the sending chip refers to chips on the sending drawer. The state in the drawer scope/vector from the sending drawer is meaningless to the receiving drawer, and therefore, requested and serviced bits in a lower scope are reset when the cache line is passed to a requestor of a higher scope.

Further details are discussed regarding passing the requested and serviced vectors around the system 200, thereby providing a decentralized hot cache line tracking fairness mechanism. In one or more embodiments, the requested and serviced fairness vectors for each cache line are passed along (e.g., from one hardware controller 350 for a shared cache 206 to the next hardware controller 350 for a shared cache 206) as part of the metadata for that cache line. In one or more embodiments, the method could pass only the serviced vector along with the cache line, because the requested vector can be rebuilt by each requestor (e.g., hardware controller 350). In one or more embodiments, there can be a combination of where the requested vector is rebuilt by some requestors (e.g., hardware controller 350) while the serviced vector is passed along with the cache line and where the requested and serviced vectors are passed along with the cache line. Only un-serviced requestors get access to the cache line next, based on checking serviced bits in the serviced vector. All serviced requestors are rejected and must come back to try again. The fairness vectors (i.e., the requested vector and serviced vector) will not be passed to a higher scope until there are no requested bits in the requested vector set for lower scopes. Serviced bits/states in the serviced vector are eventually reset based on the already established rules.

FIGS. 6, 7, and 8 depict block diagrams illustrating an example of vector maintenance and passing for decentralized hot cache line tracking fairness using preemptive tracking of remote requests according to one or more embodiments of the invention. This example scenario is vector updating and passing on chip, for example, passing the serviced vector on the same chip 0. Accordingly, the example scenario illustrates chip scope and drawer scope but does not illustrate system scope, for ease of understanding. It should be appreciated that system scope applies by analogy. Although one shared cache and its hardware controller are discussed at a time, it should be appreciated that analogous actions are being performed simultaneously or nearly simultaneously for other shared caches for the same cache line.

At action 601, shared cache L30 (which is a shared cache 206) via its controlling hardware controller 350 has access to and/or control of the cache line of a given shared cache 206. For explanation purposes, the controlling hardware controller 350 is a designation used to illustrate that the hardware controller has control of the cache line of the given shared cache. In this example, there are four shared caches 206 (e.g., L30, L31, L32, L33) depicted by four bits in the chip scope for both the requested vector and the serviced vector. Also, in this example, there are two chips 204 (e.g., chip 0, chip 1) depicted by two bits in the drawer scope. As can be seen at action 601, the hardware controller state for the requested vector is all zeros. In the requested vector, the four bits of the chip scope are all zeros because no other shared cache 206 on the same chip 204 (e.g., chip 0) has requested access to the cache line (yet). Also, in the requested vector, the two bits of the drawer scope are all zeros because no other chip has requested access to the cache line.

However, in the chip scope of the serviced vector, the first bit (i.e., the most left bit) corresponding to shared cache L30 is set to one ("1") because the shared cache L30 is being serviced (i.e., accessing the cache line of the given shared cache) in action 601, which means the hardware controller 350 for the shared cache L30 is controlling accessing to the cache line. The remaining serviced bits in the chip scope of the serviced vector are zero because the other shared caches 206 on the same chip 204 (e.g., chip 0) have not previously been serviced, which means the other shared caches 206 (e.g., L31, L32, L33) have not had access to the cache line via their respective hardware controllers 350. In the drawer scope of the serviced vector, the first bit which is the most left bit is set to one ("1") because the corresponding chip 204 which is chip 0 is being serviced. The remaining serviced bit in the drawer scope of the serviced vector is set to zero because the other chip 204 (e.g., chip 1) on the same drawer 202 (e.g., drawer 0) has not been serviced. If there were more than one drawer in this example, then a system scope would have a bit set to identify the drawer currently being serviced, thereby identifying the drawer having a chip currently serviced. Since this example shows the first round, the other serviced bits are zero but if other caches had been serviced, then their respective bits would be one.

At action 602, shared cache L32 via its requestor hardware controller 350 requests the cache line (fetches) from the requesting hardware controller 350 of shared cache L33. It is noted that actions 602 and 604 occur concurrently and/or nearly concurrently. At this point, the shared cache L32 is a requestor via its requestor hardware controller 350. Shared cache L32 via its requestor hardware controller 350 snoops on shared cache L33 and gets a response that shared cache L33 has an outstanding fetch to the cache line of the given shared cache. The snoop (also referred to as bus snooping or bus sniffing) by the requestor hardware controller 350 of shared cache L32 checks the other shared caches 206 and monitors the bus, which includes the interconnections connecting the shared caches 206, for any outstanding fetch requests from other shared caches 206. After receiving the response from the hardware controller 350 of the shared cache L33, the shared cache L32 via its requestor hardware controller 350 speculatively sets the requested bit for shared cache L33 in its requested vector, as depicted in action 602. Particularly, the hardware controller 350 of shared cache L32 records the response from shared cache L33 in the corresponding (L33) bit place in the chip scope of requested vector. As seen in the requested vector, the furthest right bit in the chip scope is now set to one ("1") which indicates the corresponding shared cache L33 at that bit position has also requested the cache line of the given shared cache.

At action 603 in FIG. 7, the shared cache L32 via its requestor hardware controller 350 requests the cache line from the controlling hardware controller 350 of the shared cache L30, and the shared cache L30 via its controlling hardware controller 350 accepts the request. Therefore, the shared cache L32 is given a copy of the cache line and the serviced vector of shared cache L30. For example, the shared cache L30 via its controlling hardware controller 350 passes the cache line to the shared cache L32 via its hardware controller 350. In addition to passing access and/or control of the cache line, the controlling hardware controller 350 of shared cache line L30 also passes the serviced vector for the cache line of the given shared cache 206 to the requestor hardware controller 350 of the shared cache L32. At this point the hardware controller 350 of shared cache L32 becomes the new controlling hardware controller 350. As the controlling (L32) hardware controller 350 of shared cache L32, the controlling (L32) hardware controller 350 sets its own serviced bits by updating the serviced bit corresponding to the shared cache L32 in the chip scope of the serviced vector from zero to one because the shared cache L32 is being serviced, which means the shared cache L32 via its controlling (L32) hardware controller 350 has access/control of the cache line in the given shared cache. Also, the controlling (L32) hardware controller 350 can keep the requested bit that it preemptively set ("1") where the requested bit corresponds to shared cache L33 in the chip scope of the requested. It is further noted that shared cache L32 launched a broadcast to all other shared caches 206, asking for the cache line. Around the same time, shared cache L33 also launched a broadcast to all other shared caches 206, asking for the cache line. In this example scenario, the shared cache L32's broadcast request arrived at shared cache L30 first, while the shared cache L33's broadcast request was still enroute to shared cache L30. In other examples, shared cache L33's broadcast could have arrived at shared cache L30 first, while shared cache L32's broadcast request was still enroute to shared cache L30.

At action 604 in FIG. 7, in response to shared cache L33 via its requestor hardware controller 350 having requested the cache line (fetches) from the requesting hardware controller 350 of shared cache L32 while the request of shared cache L32 was still outstanding, the cache line request of shared cache L33 has reached shared cache L32. Action 604 may occur concurrently with and/or near the same time as action 602, as noted herein. Shared cache L33 via its requestor hardware controller 350 snoops on shared cache L32 and gets a response that shared cache L32 has an outstanding fetch to the cache line of the given shared cache. After receiving the response from the hardware controller 350 of the shared cache L32, the shared cache L33 via its requestor hardware controller 350 speculatively sets the requested bit for shared cache L32 in its requested vector, as depicted in action 604. Particularly, the hardware controller 350 of shared cache L33 records the response from shared cache L32 in the corresponding (L32) bit place in the chip scope of requested vector. As seen in the requested vector, the second from the right bit in the chip scope is now set to one ("1") which indicates the corresponding shared cache L32 at that bit position has also requested the cache line of the given shared cache.

At action 605 in FIG. 8, in response to shared cache L33 via its requestor hardware controller 350 having requested the cache line (fetches) from the controlling hardware controller 350 of shared cache L30, the cache line request of shared cache L33 has reached shared cache L30 and is rejected because the cache line is being moved to shared cache L32. Accordingly, shared cache L33 via its requestor hardware controller 350 has to reset the requested bit for shared cache L32 that it set speculatively on this broadcast. As seen in action 605, the second from the right most bit corresponding to the bit place for shared cache L32 is rest to zero in the chip scope of the requested vector maintained by shared cache L33 because the shared cache L32 is being serviced. It is noted that the serviced vector is not preemptively maintained by the shared cache L32 because the controlling shared cache maintains its own serviced vector.

At action 606 in FIG. 8, the shared cache L33 via its requestor hardware controller 350 re-requests the cache line of the given shared cache again, and the controlling hardware controller 350 of the shared cache L32 passes the cache line to shared cache L33. In addition to passing access and/or control of the cache line, the controlling hardware controller 350 of shared cache line L33 also passed the serviced vector for the cache line of the given shared cache 206 to the requestor hardware controller 350 of the shared cache L33. At this point the hardware controller 350 of shared cache L33 becomes the new controlling hardware controller 350. As the controlling (L33) hardware controller 350 of shared cache L33, the controlling (L33) hardware controller 350 sets its own serviced bits by updating the serviced bit corresponding to the shared cache L33 in the chip scope of the serviced vector from zero to one because the shared cache L33 is being serviced, which means the shared cache L33 via its controlling (L33) hardware controller 350 has access/control of the cache line in the given shared cache.

Although some example scenarios are discussed herein in which the previous (controlling) hardware controller 350 passes both the serviced vector and requested vector for a cache line to the next (controlling) hardware controller 350, some embodiments of the invention may not pass the requested vector because each hardware controller 350 is configured with logic 320 to build the requested vector (as well as the serviced vector) using responses from other hardware controllers. Further details of maintaining the requested and serviced vectors are discussed below for setting request tracking bits in the vectors. As noted herein, the hardware controllers 350 are responsible for setting and maintaining the remote fairness vectors. After receiving a broadcast sent out on the system 200 by the querying hardware controller 350, each queried hardware controller 350 of a remote cache 206 having received the query determines if that queried hardware controller 350 will give a response, given the following are true: 1) the queried hardware controller has an outstanding fetch request; and 2) the outstanding fetch is an exclusive fetch request, or the outstanding fetch request of the queried hardware controller is one coherency authority level lower than the scope of the broadcast. If the hardware controller does not have sufficient authority, the outstanding fetch request of the remote cache might be serviced by another cache instead of by the cache doing the broadcast. Further regarding one authority level lower than the scope of the broadcast is discussed below.

One scope lower than system scope: if the cache line request originated from an L3 on Drawer 1 and if the remote cache being queried is an L3 on Drawer 2, this makes the broadcast scope a System scope. Therefore, to respond with an outstanding fetch request, the queried remote cache on Drawer 2 must have the coherency Drawer coherency authority (DIM). If the queried remote cache has only Chip (CIM) or non-IM authority, queried remote cache cannot respond that it has an outstanding fetch request.

One scope lower than drawer scope: if the cache line request originated from an L3 on Chip 1 and if the remote cache being queried is an L3 on Chip 2, this makes the broadcast scope a Drawer scope. Therefore, to respond with an outstanding fetch request, the queried remote cache on Chip 2 must have the coherency Chip coherency authority (CIM). If the queried remote cache has only non-IM authority, the queried remote cache cannot respond that it has an outstanding fetch request.

One scope lower than chip scope: if the cache line request originated from an L30 on Chip 1 and if the remote cache being queried is an L31 on Chip 1, this makes the broadcast scope a Chip scope. Therefore, to respond with an outstanding fetch request, the queried remote cache L31 must have non-IM coherency.

More particularly, a querying hardware controller 350 (of its shared cache 206) requesting a copy of the cache line of a given shared cache 206 broadcasts its fetch request to all other shared caches 206 having hardware controllers 350 in the system 200 at the same time as and/or nearly the same time as sending a query to other hardware controllers 350 of shared caches 206 to inquire if the queried hardware controllers 350 have outstanding fetch requests for the (same) cache line of the given shared cache 206. Each queried hardware controller 350 of other shared caches provides an indication if it has the cache line and an indication if that queried hardware controller 350 has an outstanding fetch request that meets the previous criteria.

If a queried hardware controller 350 having made a request is on chip (i.e., on the same chip 204 as the querying hardware controller 350), then a requested bit is set in the chip scope of the (preemptive) requested vector of the querying hardware controller 350, for each queried hardware controller 350 (of its shared cache 206) that returned an outstanding fetch response. If the queried hardware controller 350 having made a request is off chip and on drawer (i.e., on the same drawer 202 as but a different chip 204 than the querying hardware controller 350), then the outstanding fetch responses on the same chip 204 are logically ORed together by the querying hardware controller 350, which means an OR logic operation returns true if either of its inputs are true and false otherwise. That OR result is then sent to the chip 204 of the querying hardware controller 350 having made the query, which uses the result to set the corresponding requested bit in the drawer scope in the requested vector. In one or more embodiments, a queried hardware controller 350 (on the same chip as other queried hardware controllers 305) can perform the OR logic operation for responses on its same chip 204 and then send OR result to the querying hardware controller 350. In one or more embodiments, the querying hardware controller 350 can perform the OR logic operation for the response from off-chip queried hardware controllers 350. Also, if a queried hardware controller 350 (having made a request) has achieved the appropriate level of authority and has an outstanding request, this can also be ORed into the OR result that is utilized by the querying hardware controller 350 to set requested bit of the drawer scope of the requested vector.

If the queried hardware controller 350 having made a request is off drawer, then the outstanding fetch responses on the drawer are ORed together. That OR result is then sent to the drawer 202 of the queried hardware controller 350, which uses the OR result to set the corresponding request bit in the system scope in the requested vector. In one or more embodiments, a queried hardware controller 350 (on the same drawer as other queried hardware controllers 305) can perform the OR logic operation for responses on its same drawer 202 and then send OR result to the querying hardware controller 350. In one or more embodiments, the querying hardware controller 350 can perform the OR logic operation for all the responses from off-drawer queried hardware controllers 350. If there is a rebroadcast, any remote fairness data in the requested vector that was collected outside of the authority level achieved by the queried hardware controller 350 must be cleared. The following example scenario regarding authority level is provided for explanation purposes. The requesting cache with CIM authority broadcasts to get GIM authority for the cache line, and the following occurs on that broadcast. The requesting cache finds outstanding on-chip misses (i.e., outstanding requests), and this causes requested bits to be set in the chip scope of the requested vector. The requesting cache finds outstanding on-drawer misses (i.e., outstanding requests), this causes requested bits to be set in the drawer scope of the requested vector. The requesting cache finds outstanding off-drawer misses (i.e., outstanding requests), and this causes requested bits to be set in the system scope of the requested vector. Now, it is assumed that the request by the requesting cache successfully acquired DIM authority but is rejected by the GIM. The requesting cache can keep the requested bits in the chip scope in the requested vector because the requesting cache has CIM or higher authority at the completion of the broadcast, i.e., both because it started as CIM, and because it acquired DIM, which is higher than CIM. The requesting cache can keep the requested bits in the drawer scope of the requested vector because it acquired DIM authority on this broadcast. The requested bits in the system scope of the requested vector must be reset because GIM authority was not achieved.

Figure 9:
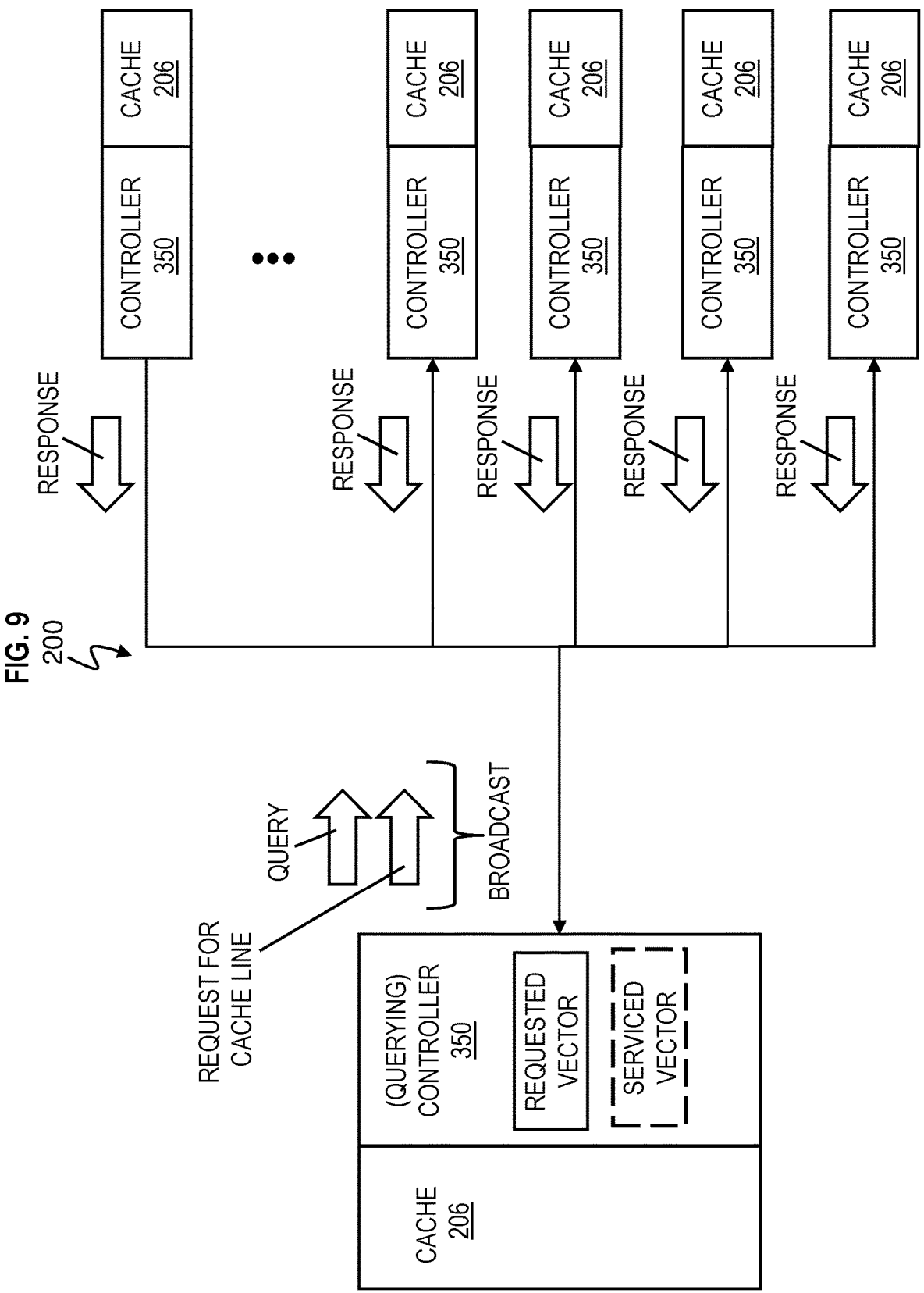
FIG. 9 depicts a block diagram illustrating preemptive tracking of remote requests decentralized hot cache line fairness tracking according to one or more embodiments of the present invention.

FIG. 9 depicts a block diagram illustrating preemptive tracking of remote requests decentralized hot cache line fairness tracking according to one or more embodiments. FIG. 9 is a simplified version of system 200 that omits some details, and it should be appreciated that any omitted details are included in system 200. In the example scenario in FIG. 9, a hardware controller 350 is designated as the querying hardware controller 350 for explanation purposes, where the querying hardware controller 350 includes logic 320 to broadcast its request for the cache line of a given shared cache 206 while simultaneously or nearly simultaneously broadcasting a query to all other hardware controllers 350 (for their respective shared caches 206) in order to determine which other hardware controllers 350 have also requested the cache line of the given shared cache 206. For ease of understanding, the other hardware controllers 350 having received the query may be referred to as the queried hardware controllers 350. The queried hardware controllers 350 have logic 320 configured to respond back to the query with a response according to criteria discussed herein, in accordance with embodiments of the invention. The querying hardware controller 350 is configured to preemptively build a requested vector in memory 322 for the responses received from the queried hardware controllers 350, which is in anticipation of the querying hardware controlled 350 gaining access/control of the cache line and receiving the serviced vector from the previous controlling hardware controller 350. If the querying hardware controller 350 does not get authority to access/control the cache line of the given shared cache 206, the requested vector is dropped or discarded from memory 322. It should be appreciated that, although FIG. 9 depicts a single hardware controller 350 making a query, the other hardware controllers 350 make queries while broadcasting their respective (fetch) requests for the cache line of the given shared cache 206, such that each of the other hardware controllers 350 have their own preemptively built requested vector. A querying hardware controller 350 may preemptively build the requested vector before, during, and/or after sending its request for the cache line of the given shared cache 206.

Figure 10:
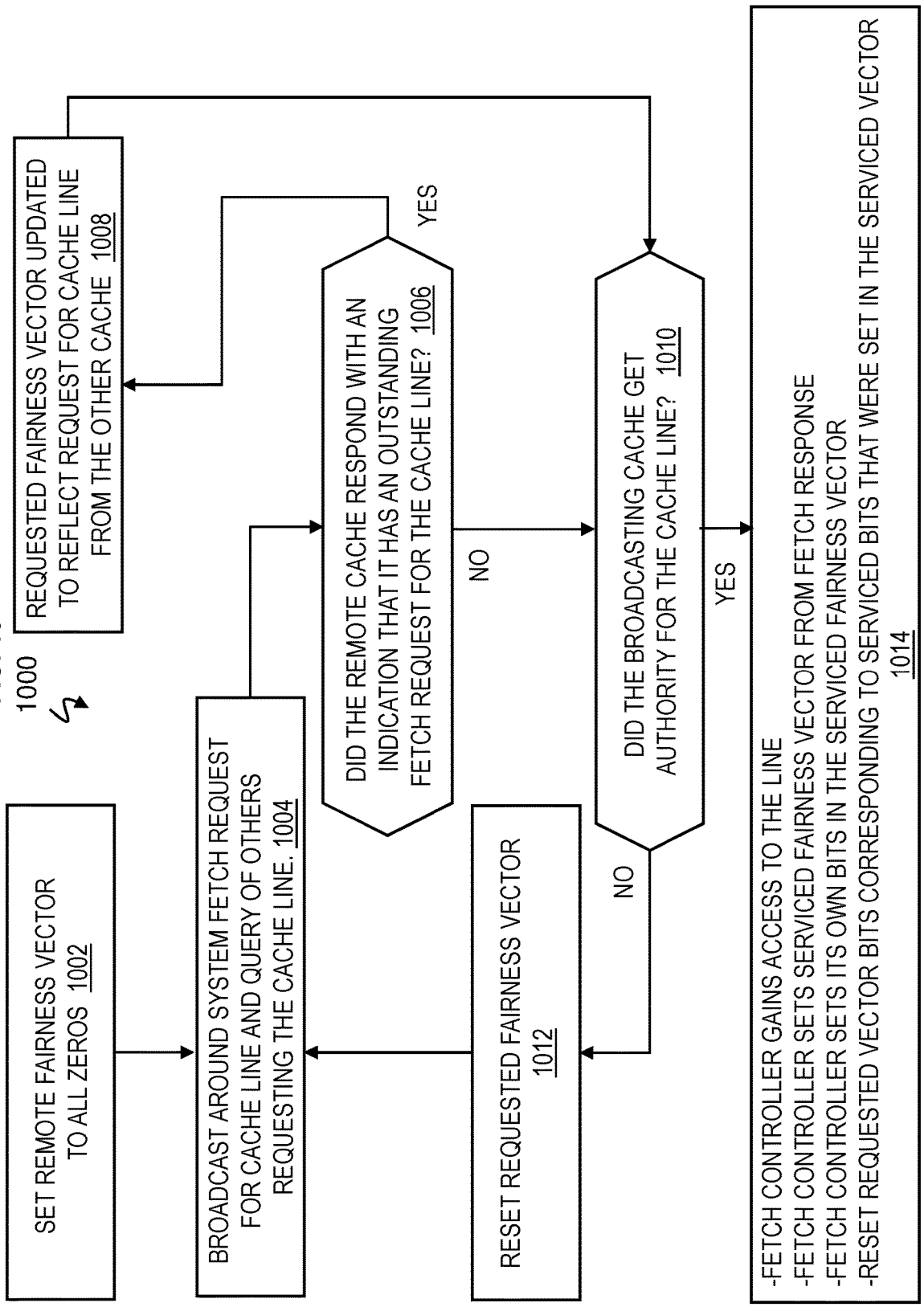
FIG. 10 is a flowchart of a process for preemptive tracking of remote requests for decentralized hot cache line fairness tracking according to one or more embodiments of the present invention.

FIG. 10 is a flowchart of a process 1000 for preemptive tracking of remote requests for decentralized hot cache line fairness tracking according to one or more embodiments. FIG. 10 illustrates an example from the perspective of a querying hardware controller 350, which is sometimes referred to as the local cache, sending queries to and receiving responses from various (queried) hardware controllers 350, which are sometimes referred to as remote caches because each cache has its own hardware controllers.

At block 1002, the querying hardware controller 350 is configured to build a remote vector in memory 322 and set all its requested bits to zero, in advance of receiving the cache line. At block 1004, the querying hardware controller 350 is configured to broadcast around the system 200 the fetch request for the cache line of the given shared cache 206 and a query of other hardware controllers 350 (i.e., other requestors) of shared caches 206 requesting the cache line.

At block 1006, the querying hardware controller 350 is configured to check whether a queried hardware controller 350 of a remote cache responded with an indication that the queried hardware controller 350 has an outstanding fetch request for the cache line of the given shared cache 206. At block 1008, if ("YES") the queried hardware controller 350 responds back with a response that it has an outstanding fetch request for the cache line of the given shared cache 206, the querying hardware controller 350 is configured to update the requested vector to reflect the request for the cache line from the queried hardware controller 350. For example, the requested bit is set to one ("1") in the chip scope, drawer scope, and/or system scope of the requested vector according to the response from the queried hardware controller 350. The chip scope, drawer scope, and system scope are relative to the shared cache 206 of the querying hardware controller 350. It should be appreciated that blocks 1006 and 1008 are repeated for each of the queried hardware controllers 350. As noted herein, some responses from the same off chip can be ORed together before setting the corresponding requested bit in the drawer scope of the requested vector. Also, some responses from the same off drawer can be ORed together before setting the corresponding requested bit in system scope of the requested vector.

At block 1010, if ("NO") the queried hardware controller 350 does not respond back with a response that it has an outstanding fetch request for the cache line of the given shared cache 206, the querying hardware controller 350 is configured to check did the querying hardware controller 350 get authority for the cache line. Authority is given from a previous hardware controller 350 having the desired authority. Authority for the cache line of the shared cache 206 is typically given before access/control of the cache line is given. In one or more embodiments, authority to the cache line and access/control of the cache line may be given together or nearly at the same time.

At block 1012, if ("NO") the queried hardware controller 350 does not get authority for the cache line of the given shared cache 206, the querying hardware controller 350 is configured to reset the requested bits in the requested vector, and flow proceeds to block 1004.

At block 1014, if ("YES") the queried hardware controller 350 does get authority for the cache line of the given shared cache 206, the querying hardware controller 350 is configured to gain access to the cache line, set serviced bits in serviced vector from fetch response, set its own serviced bits in the chip scope of the serviced vector that correspond to the querying hardware controller 350 (i.e., set the serviced bits that correspond to bit place/position of the shared cache 206 for the querying hardware controller 350), and reset requested bits (to zero) in the requested vector corresponding to the service bits that were just set in the serviced vector for the querying hardware controller 350. The querying hardware controller 350 now becomes the controlling hardware controller 350. The querying hardware controller 350 receives the serviced vector from the previous controlling hardware controller 350 along with the cache line and may receive the requested vector from the previous controlling hardware controller 350. When the querying hardware controller 350 also receives transfer of the requested vector from the previous controlling hardware controller 350, the querying hardware controller 350 is configured to reconcile the set requested bits in preemptively built requested vector with the transferred-in requested vector. In an example scenario, the serviced vector is passed along with the cache line metadata, and when a new fetch controller gains access to the cache line, the fetch controller must update its own serviced vector to reflect the serviced vector that came along with the cache line metadata. For example, shared cache L30 is passing the cache line to shared cache L33. Shared cache L33 must update its serviced vector to reflect the serviced vector that shared cache L30 had.

Figure 11:
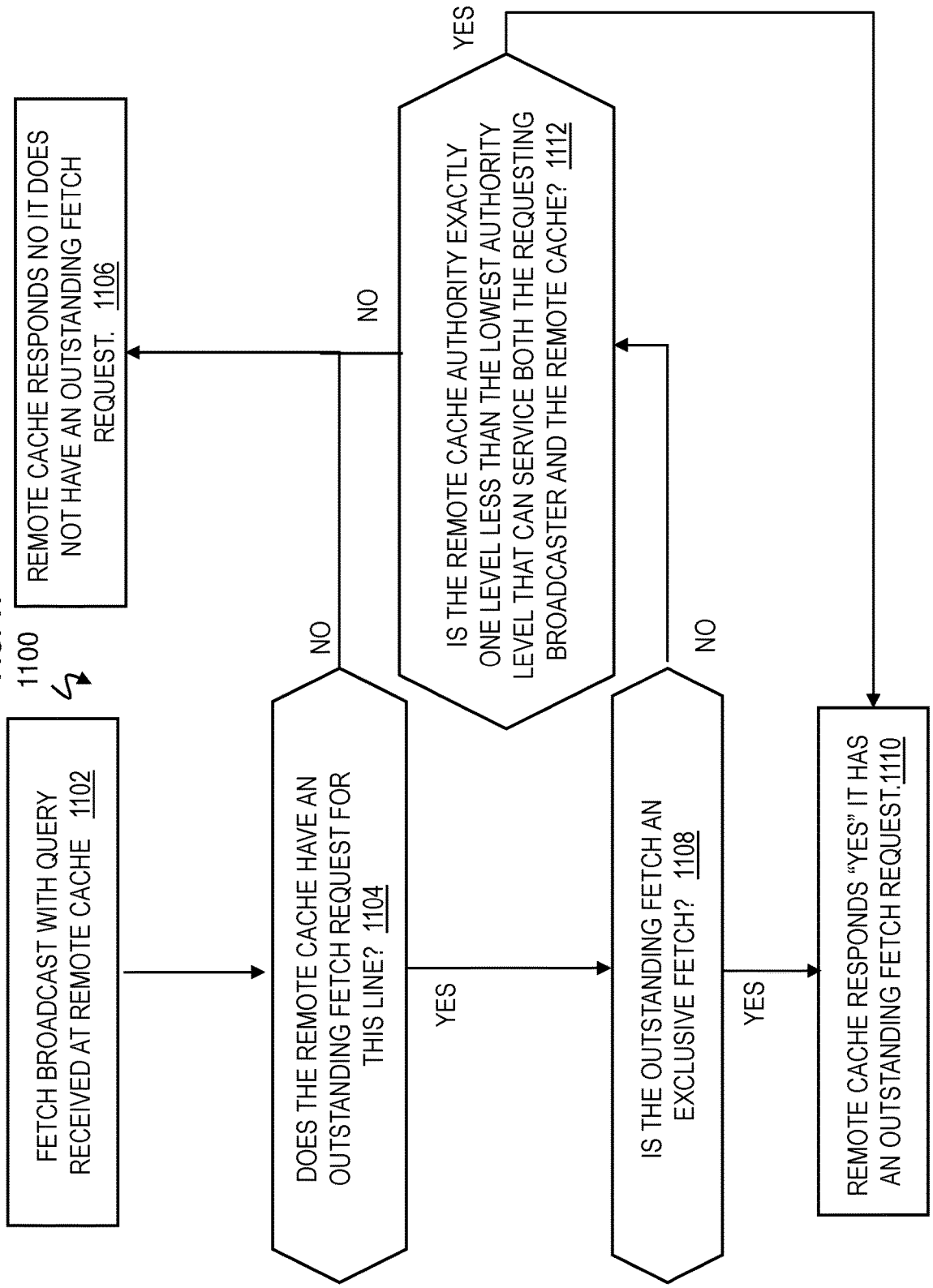
FIG. 11 is a flowchart of a process for preemptive tracking of remote requests for decentralized hot cache line fairness tracking according to one or more embodiments of the present invention.

FIG. 11 is a flowchart of a process 1100 for preemptive tracking of remote requests for decentralized hot cache line fairness tracking according to one or more embodiments. FIG. 11 illustrates an example from the perspective of queried hardware controllers 350, which are sometimes referred to as remote caches. The queried hardware controllers 350 are receiving a query from and sending responses to the querying hardware controller 350, which is sometimes referred to as the local cache.

At block 1102, a queried hardware controller 350 is configured to receive a fetch broadcast with a query about a cache line for a given shared cache 206 from a querying hardware controller 350. At block 1104, the queried hardware controller 350 is configured to check whether it has an outstanding fetch request for the cache line of the given shared cache 206. At block 1106, if ("NO") the queried hardware controller 350 does not have an outstanding fetch request for the cache line of the given shared cache, the queried hardware controller 350 is configured to respond no it does not have an outstanding fetch request for the cache line.

At block 1108, if ("YES") the queried hardware controller 350 does have an outstanding fetch request for the cache line of the given shared cache 206, the queried hardware controller 350 is configured to check with the outstanding fetch request is an exclusive fetch. An exclusive fetch request is a request for exclusive ownership of a cache line.

At block 1110, if ("YES") the queried hardware controller 350 does have an exclusive fetch request for the cache line of the given shared cache 206, the queried hardware controller 350 is configured to respond back yes it has an outstanding fetch request to the querying hardware controller 350.

At block 1112, if ("NO") the queried hardware controller 350 does not have an exclusive fetch request for the cache line of the given shared cache 206, the queried hardware controller 350 is configured to check if it has authority exactly one level less that the lowest authority level that can service both the requesting broadcaster (e.g., the querying hardware controller 350) and the remote cache (i.e., the queried hardware controller 350). There are varying levels of "authority" of which a hardware controller can own a copy of a cache line. In this scenario, the authority determines whether or not the queried cache has enough visibility to respond accurately to the request. For example, there can be multiple hardware controllers that have read-only (non-IM authority) copies of the cache line. The scopes and authorities have been discussed herein. If the answer is negative ("NO") at block 1112, flow proceeds to block 1106. If answer is positive ("YES") at block 1112, flow proceeds to block 1110.

It should be appreciated various operations described in FIGS. 10 and 11 can be performed cooperatively for the preemptive tracking of remote requests for decentralized hot cache line fairness tracking according to one or more embodiments. Additionally, various hardware controllers 350 can be concurrently performing operations described in FIGS. 10 and 11, although a single hardware controller 350 may have been identified at times.

Further regarding passing the vector around the system 200, as discussed herein the remote fairness serviced vector is passed along with the data of the cache line (as a fetch response) as part of the metadata for the cache line. In one or more embodiments, the requested vector can be rebuilt by each (fetch) hardware controller 350 and therefore may not have to be passed around the system 200. As an optional enhancement, the requested vector could be passed along with the serviced vector and fetch response, even if a hardware controller preemptively builds its own requested vector.

Further, in one or more embodiments, rather than accumulating information on which requestors are outstanding (i.e., have outstanding fetch requests), the querying hardware controller 350 may only collect a summary, which indicates that some outstanding requests exists. For instance, an indication may be collected that there is an outstanding request for the cache line on this chip, but not which shared cache 206 (L3 cache) on the chip is making the request. In this case, a requesting shared cache 206 (L3 cache) will wait a fixed interval, after achieving coherency, to determine if there are still any un-serviced requests from other caches (L3 caches) on this chip. After the interval expires, the requested bits in the chip scope, drawer scope, and system scope are reset in the requested vector. As a further option, requests from higher scopes would be rejected during this interval.

Further technical solutions and benefits are provided for preemptive tracking of remote requests for decentralized hot cache line fairness tracking according to one or more embodiments. A method of ensuring cache line fairness may include the following: broadcasting a request for a cache line; querying other caches to determine if they have an outstanding fetch request for that cache line; having a remote cache respond with an indication it has an outstanding fetch request; collecting the responses to those queries in a hardware controller; and maintaining a serviced vector of requestors that have received a copy of the cache line. Additionally, the method includes storing the collected responses to those queries in a requested vector, retiring the hardware controller when all outstanding requests have been serviced, transferring the serviced vector to another cache's hardware controller in response to a fetch request, and invalidating this cache's hardware controller. To preemptively build the requested vector, technical solutions and benefits include collecting all the lower scope responses into a single response to a request at a higher scope and dropping the collected responses if the broadcast does not achieve authority for the cache line. There can be different criteria for a remote cache (via its hardware controller) to respond: 1) the remote cache responds that it has an outstanding fetch request if that request is an exclusive fetch; 2) the remote cache responds that it has an outstanding fetch request if it is processing a non-exclusive fetch and it has an authority level exactly one level less than the lowest authority level that can service both the requestor and the remote cache; and/or 3) a fetch hardware controller on a remote chip responds if it has an outstanding fetch request and if it has an authority level exactly one level less than the lowest authority level that can service both the requestor and the remote chip.

Figure 12:
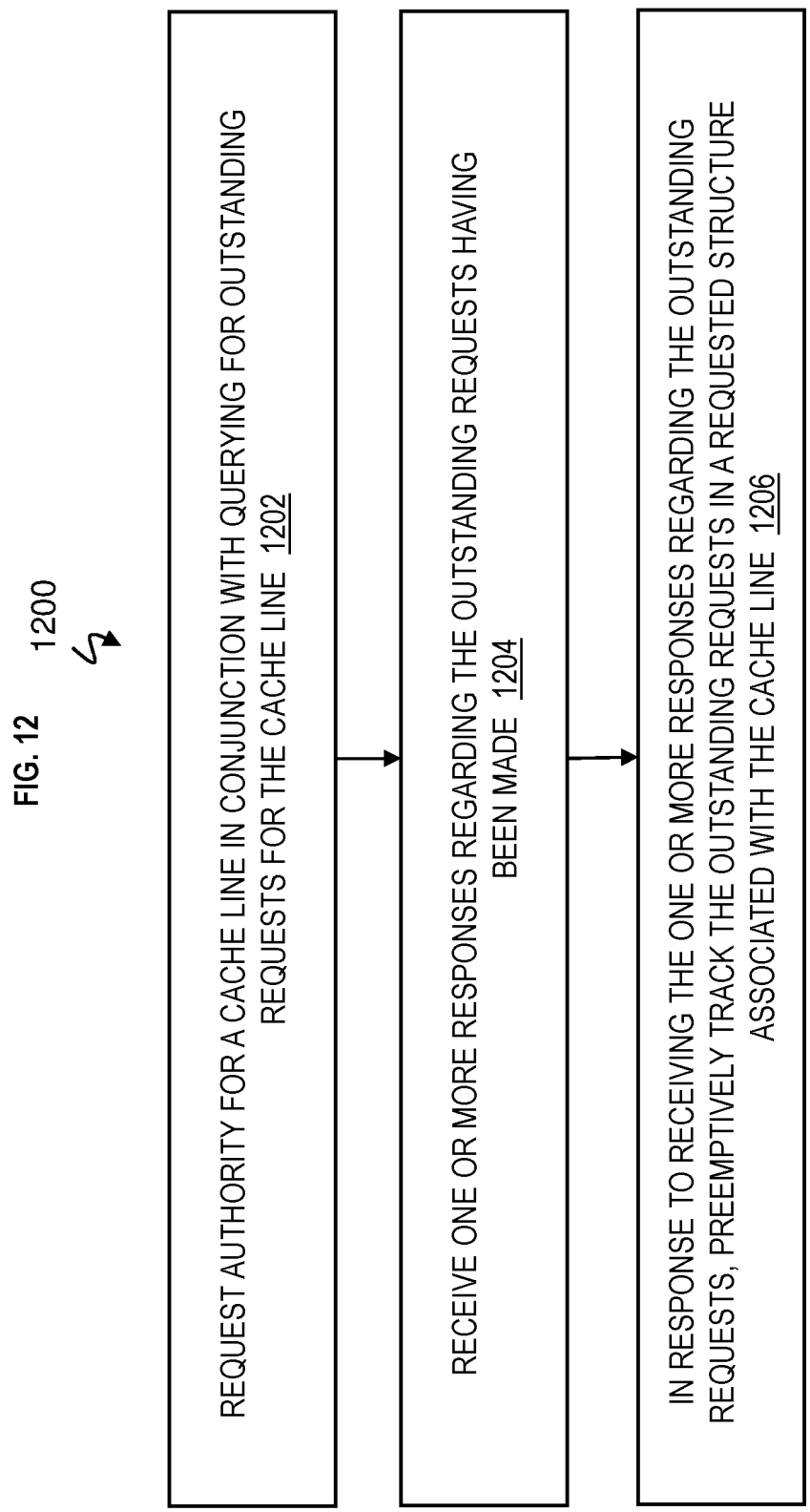
FIG. 12 is a flowchart of a computer-implemented method for preemptive tracking of remote requests for decentralized hot cache line fairness tracking according to one or more embodiments of the present invention.

FIG. 12 is a flowchart of a computer-implemented method 1200 for preemptive tracking of remote requests for decentralized hot cache line fairness tracking according to one or more embodiments. Reference can be made to any of the figures discussed herein.

At block 1202, the querying hardware controller 350 is configured to request authority for a cache line (of a shared cache 206) in conjunction with querying (queried hardware controllers 350) for outstanding requests for the cache line of a given shared cache 206. The querying hardware controller 350 sends the queries prior to receiving the cache line. The querying hardware controller 350 can request authority from the controlling hardware controller 350 that currently owns/controls the cache line of the given shared cache 206. At block 1204, the querying hardware controller 350 is configured to receive one or more responses regarding the outstanding requests having been made (by queried hardware controllers 350) for the cache line. At block 1206, the querying hardware controller 350 is configured to, in response to receiving the one or more responses regarding the outstanding requests and in advance of receiving the authority for the cache line, preemptively track the outstanding requests in a requested structure associated with the cache line.

Preemptively tracking the outstanding requests in the requested structure associated with the cache line comprises setting a bit corresponding to the one or more responses. The querying hardware controller 350 is configured to receive the authority for the cache line along with receiving access to the cache line. The querying hardware controller 350 is configured to, in response to receiving the authority for the cache line along with receiving access to the cache line, receive transfer of a serviced structure associated with the cache line and keep any requested bits preemptively set in the requested structure, wherein the bits were set in advance of receiving the authority. The querying hardware controller 350 is configured to, in response to not receiving the authority for the cache line, reset the requested structure.

A serviced structure is received from a controller (e.g., previous hardware controller 350) previously having the authority, the serviced structure being configured to track requests to access the cache line that are observed and have been granted access to the cache line. The requested structure is built (e.g., by the querying hardware controller 350) in anticipation of receiving the authority for a cache line. The one or more responses regarding the outstanding requests correspond to an exclusive fetch request (e.g., made by queried hardware controllers 350 for their respective shared caches 206).

The one or more responses regarding the outstanding requests are based on a determination that a responding cache (e.g., queried hardware controllers 350 for their respective shared caches 206) has an authority level for the cache line in which the authority level is one level lower than a lowest authority level capable of servicing both a requesting cache (e.g., querying hardware controller 350) and the responding cache (e.g., queried hardware controller 350 for its shared cache 206).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
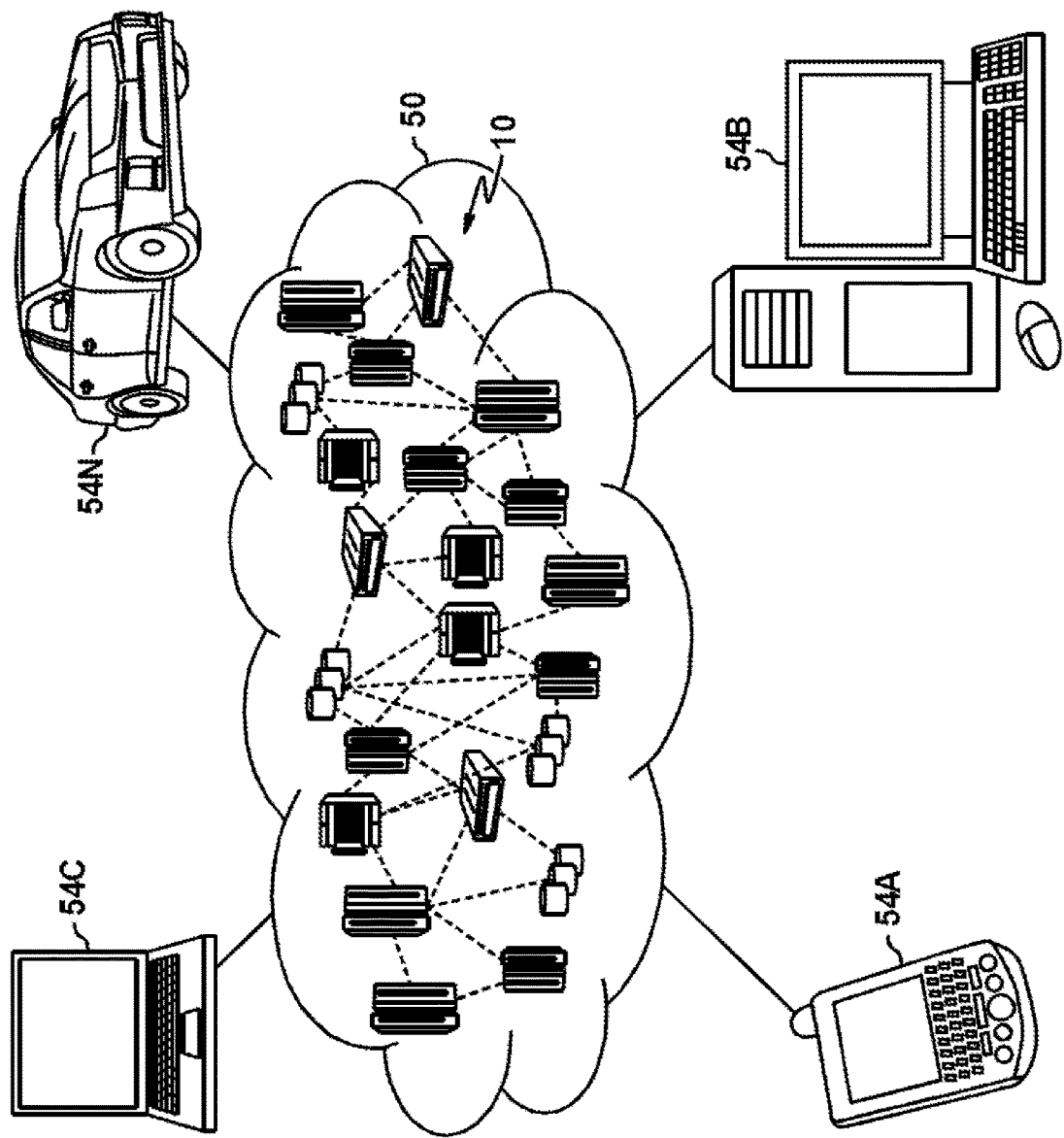
FIG. 13 depicts a cloud computing environment according to one or more embodiments of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
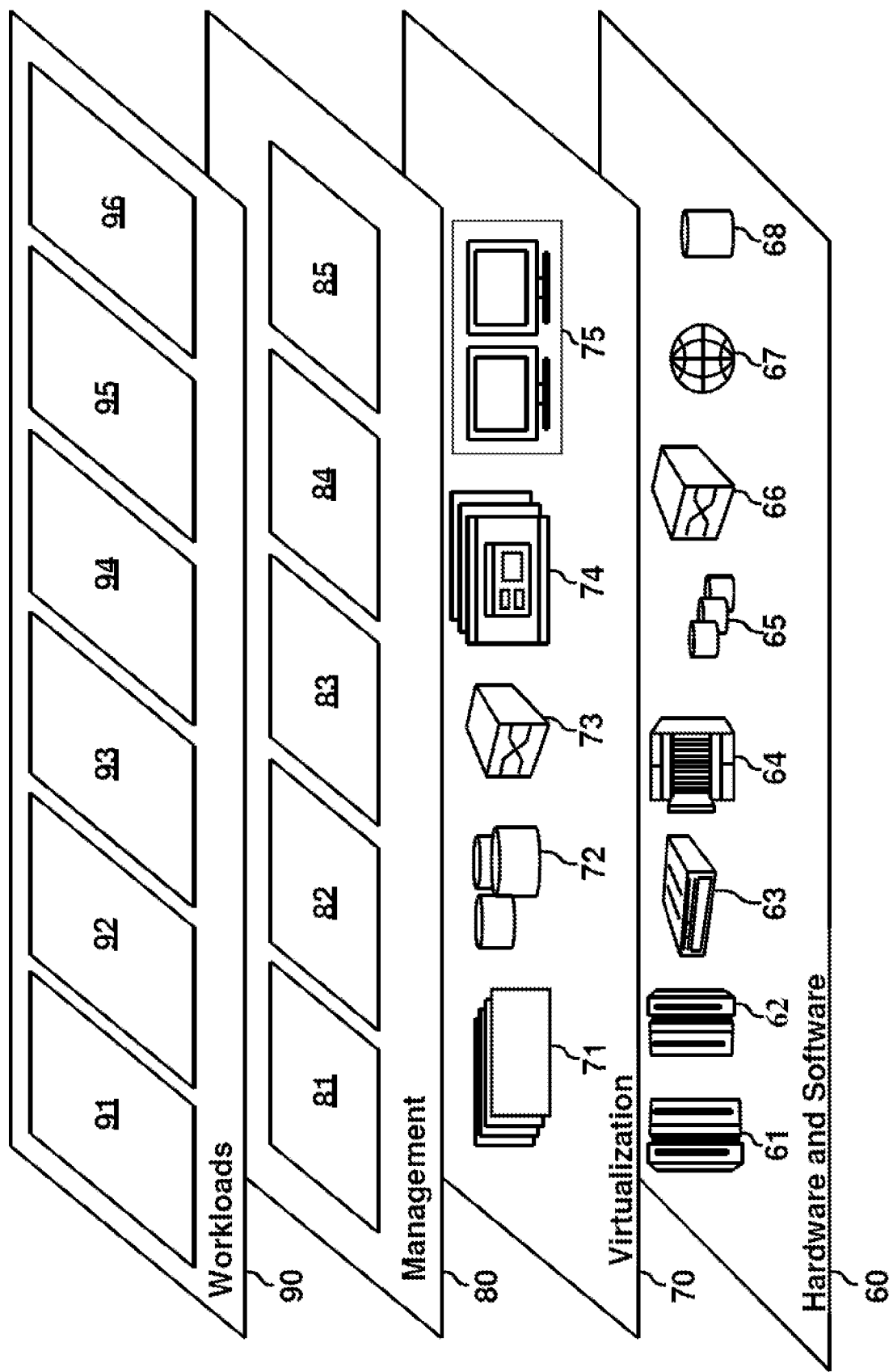
FIG. 14 depicts abstraction model layers according to one or more embodiments of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. In one or more embodiments, the hardware components can include system 200 discussed herein including the hardware controllers 350.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96.

FIG. 15 is a block diagram of a system 1500 according to embodiments of the invention. The system 1500 includes processing circuitry 1510 used to generate the design 1530 that is ultimately fabricated into an integrated circuit 1520 (e.g., chips 204), which use the decentralized hot cache line tracking fairness mechanism. The steps involved in the fabrication of the integrated circuit 1520 are well-known and briefly described herein. Once the physical layout 1540 is finalized, based, in part, on being configured to use the decentralized hot cache line tracking fairness mechanism according to embodiments of the invention, the finalized physical layout 1540 is provided to a foundry. Masks are generated for each layer of the integrated circuit based on the finalized physical layout. Then, the wafer is processed in the sequence of the mask order. The processing includes photolithography and etch. This is further discussed with reference to FIG. 16.

FIG. 16 is a process flow of a method of fabricating the integrated circuit according to exemplary embodiments of the invention. Once the physical design data is obtained, based, in part, on using the decentralized hot cache line tracking fairness mechanism in the chips 204, the integrated circuit 1520 can be fabricated according to known processes that are generally described with reference to FIG. 16. Generally, a wafer with multiple copies of the final design is fabricated and cut (i.e., diced) such that each die is one copy of the integrated circuit 1520. At block 1610, the processes include fabricating masks for lithography based on the finalized physical layout. At block 1620, fabricating the wafer includes using the masks to perform photolithography and etching. Once the wafer is diced, testing and sorting each die is performed, at block 1630, to filter out any faulty die.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The phrase "selective to," such as, for example, "a first element selective to a second element," means that the first element can be etched and the second element can act as an etch stop.

As used herein, "p-type" refers to the addition of impurities to an intrinsic semiconductor that creates deficiencies of valence electrons. In a silicon-containing substrate, examples of p-type dopants, i.e., impurities, include but are not limited to: boron, aluminum, gallium and indium.

As used herein, "n-type" refers to the addition of impurities that contributes free electrons to an intrinsic semiconductor. In a silicon containing substrate examples of n-type dopants, i.e., impurities, include but are not limited to antimony, arsenic and phosphorous.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device.

As noted above, atomic layer etching processes can be used in the present invention for via residue removal, such as can be caused by via misalignment. The atomic layer etch process provide precise etching of metals using a plasma-based approach or an electrochemical approach. The atomic layer etching processes are generally defined by two well-defined, sequential, self-limiting reaction steps that can be independently controlled. The process generally includes passivation followed selective removal of the passivation layer and can be used to remove thin metal layers on the order of nanometers. An exemplary plasma-based approach generally includes a two-step process that generally includes exposing a metal such a copper to chlorine and hydrogen plasmas at low temperature (below 20° C.). This process generates a volatile etch product that minimizes surface contamination. In another example, cyclic exposure to an oxidant and hexafluoroacetylacetone (Hhfac) at an elevated temperature such as at 275° C. can be used to selectively etch a metal such as copper. An exemplary electrochemical approach also can include two steps. A first step includes surface-limited sulfidization of the metal such as copper to form a metal sulfide, e.g., $Cu_2S$, followed by selective wet etching of the metal sulfide, e.g., etching of $Cu_2S$ in HCl. Atomic layer etching is relatively recent technology and optimization for a specific metal is well within the skill of those in the art. The reactions at the surface provide high selectivity and minimal or no attack of exposed dielectric surfaces.

Semiconductor lithography is the formation of three-dimensional relief images or patterns on the semiconductor substrate for subsequent transfer of the pattern to the substrate. In semiconductor lithography, the patterns are formed by a light sensitive polymer called a photoresist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The photoresist can be formed using conventional deposition techniques such chemical vapor deposition, plasma vapor deposition, sputtering, dip coating, spin-on coating, brushing, spraying and other like deposition techniques can be employed. Following formation of the photoresist, the photoresist is exposed to a desired pattern of radiation such as X-ray radiation, extreme ultraviolet (EUV) radiation, electron beam radiation or the like. Next, the exposed photoresist is developed utilizing a conventional resist development process.

After the development step, the etching step can be performed to transfer the pattern from the patterned photoresist into the interlayer dielectric. The etching step used in forming the at least one opening can include a dry etching process (including, for example, reactive ion etching, ion beam etching, plasma etching or laser ablation), a wet chemical etching process or any combination thereof.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   requesting authority for a cache line in conjunction with querying for outstanding requests for the cache line;
   receiving one or more responses regarding the outstanding requests for the cache line;
   in response to receiving the one or more responses regarding the outstanding requests and in advance of receiving the authority for the cache line, preemptively tracking the outstanding requests in a requested structure associated with the cache line; and
   receiving transfer of a serviced structure associated with the cache line and keeping bits set in the requested structure, wherein the bits were set in advance of receiving the authority.

2. The computer-implemented method of claim 1, wherein preemptively tracking the outstanding requests in the requested structure associated with the cache line comprises setting a bit corresponding to the one or more responses.

3. The computer-implemented method of claim 1, wherein the serviced structure is received in response to receiving the authority for the cache line along with receiving access to the cache line.

4. The computer-implemented method of claim 1, further comprising, in response to not receiving the authority for the cache line, resetting the requested structure.

5. The computer-implemented method of claim 1, wherein the serviced structure is received from a controller previously having the authority, the serviced structure being configured to track requests to access the cache line that are observed and have been granted access to the cache line.

6. The computer-implemented method of claim 1, wherein the requested structure is built in anticipation of receiving the authority for the cache line.

7. The computer-implemented method of claim 1, wherein the one or more responses regarding the outstanding requests correspond to an exclusive fetch request.

8. The computer-implemented method of claim 1, wherein the one or more responses regarding the outstanding requests are based on a determination that a responding cache has an authority level for the cache line in which the authority level is one level lower than a lowest authority level capable of servicing both a requesting cache and the responding cache.

9. A system comprising:
   a shared cache; and
   a controller coupled to the shared cache, the controller configured to:
     request authority for a cache line in conjunction with querying for outstanding requests for the cache line;
     receive one or more responses regarding the outstanding requests for the cache line;
     in response to receiving the one or more responses regarding the outstanding requests and in advance of receiving the authority for the cache line, preemptively track the outstanding requests in a requested structure associated with the cache; and
     receive transfer of a serviced structure associated with the cache line and keeping bits set in the requested structure, wherein the bits were set in advance of receiving the authority.

10. The system of claim 9, wherein preemptively tracking the outstanding requests in the requested structure associated with the cache line comprises setting a bit corresponding to the one or more responses.

11. The system of claim 9, wherein the serviced structure is received in response to receiving the authority for the cache line along with receive access to the cache line.

12. The system of claim 9, wherein the controller is configured to, in response to not receiving the authority for the cache line, reset the requested structure.

13. The system of claim 9, wherein the serviced structure is received from another controller previously having the authority, the serviced structure being configured to track requests to access the cache line that are observed and have been granted access to the cache line.

14. The system of claim 9, wherein the requested structure is built in anticipation of receiving the authority for the cache line.

15. The system of claim 9, wherein the one or more responses regarding the outstanding requests correspond to an exclusive fetch request.

16. A controller comprising logic, the logic executable to perform operations comprising:
   requesting authority for a cache line in conjunction with querying for outstanding requests for the cache line;
   receiving one or more responses regarding the outstanding requests for the cache line;
   in response to receiving the one or more responses regarding the outstanding requests and in advance of receiving the authority for the cache line, preemptively tracking the outstanding requests in a requested structure associated with the cache line; and
   receiving transfer of a serviced structure associated with the cache line and keeping bits set in the requested structure, wherein the bits were set in advance of receiving the authority.

17. The controller of claim 16, wherein preemptively tracking the outstanding requests in the requested structure associated with the cache line comprises setting a bit corresponding to the one or more responses.

18. The controller of claim 16, wherein the serviced structure is received in response to receiving the authority for the cache line along with receiving access to the cache line.

19. The controller of claim 16, wherein the logic is executable to perform operations further comprising, in response to not receiving the authority for the cache line, resetting the requested structure.

20. The controller of claim 16, wherein the serviced structure is received from another controller previously having the authority, the serviced structure being configured to track requests to access the cache line that are observed and have been granted access to the cache line.

* * * * *